United States Patent [19]

Goor

[11] Patent Number: 4,769,583

[45] Date of Patent: Sep. 6, 1988

[54] MOTION CONTROL SYSTEM WITH MINIMUM TIME PATH GENERATION

[75] Inventor: Robert M. Goor, Birmingham, Mich.

[73] Assignee: General Motors Corporation, Detroit, Mich.

[21] Appl. No.: 45,041

[22] Filed: May 1, 1987

[51] Int. Cl.⁴ ............................................. G05B 19/10
[52] U.S. Cl. .................................. 318/568; 318/569; 318/567; 364/167.01; 364/172; 364/174
[58] Field of Search ............... 318/573, 568, 567, 569, 318/570; 364/132, 169, 168, 167, 174, 172, 513, 730, 768

[56] References Cited

U.S. PATENT DOCUMENTS

| | | | |
|---|---|---|---|
| 3,882,304 | 5/1975 | Walters | 318/569 |
| 4,262,336 | 4/1981 | Pritchard | 364/474 |
| 4,449,196 | 5/1984 | Pritchard | 364/768 |
| 4,603,286 | 7/1986 | Sakano | 318/615 |
| 4,663,726 | 5/1987 | Chand et al. | 318/573 |
| 4,689,756 | 8/1987 | Koyama et al. | 364/513 |

Primary Examiner—William M. Shoop, Jr.
Assistant Examiner—Brian Young
Attorney, Agent, or Firm—Mark A. Navarre

[57] ABSTRACT

A minimum time path generation routine for a motion control system, where the routine is uniquely adapted for use in a digital mechanization.

14 Claims, 23 Drawing Sheets

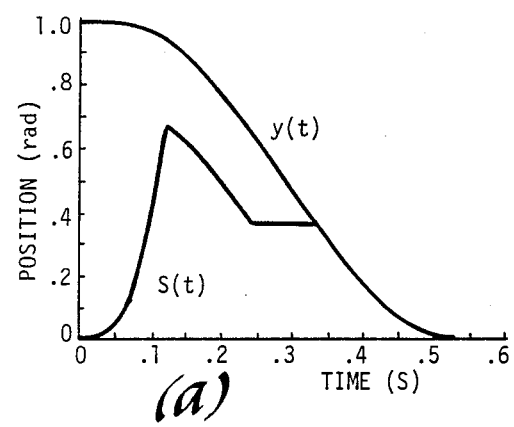
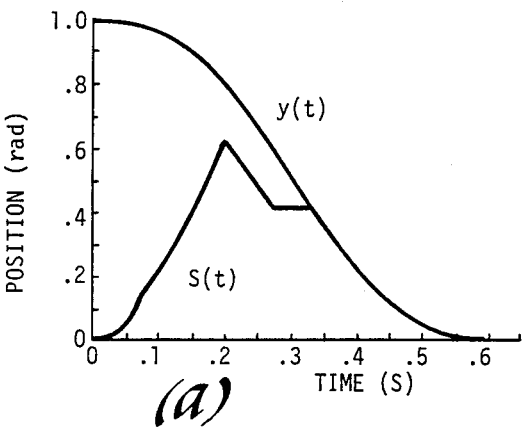
(a)
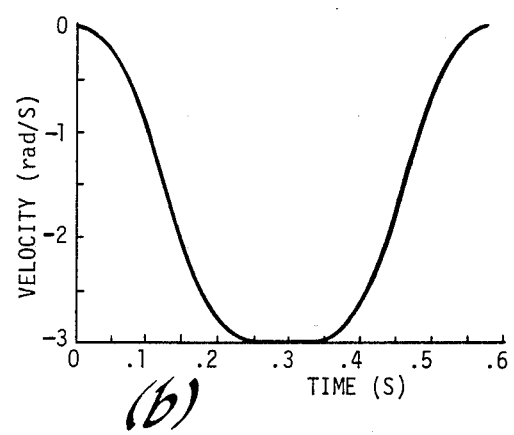
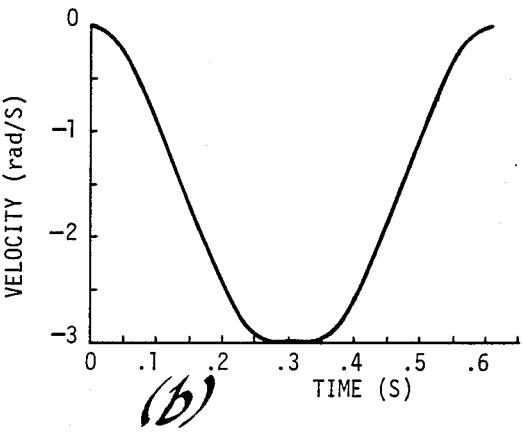
(b)
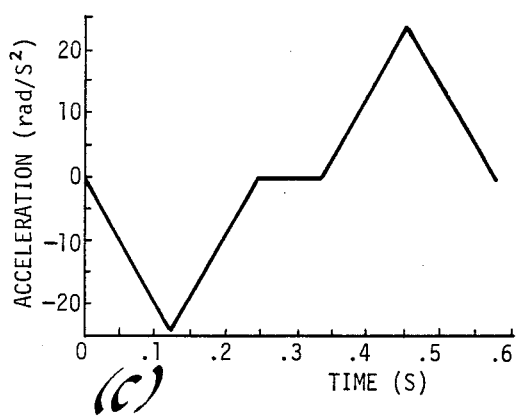
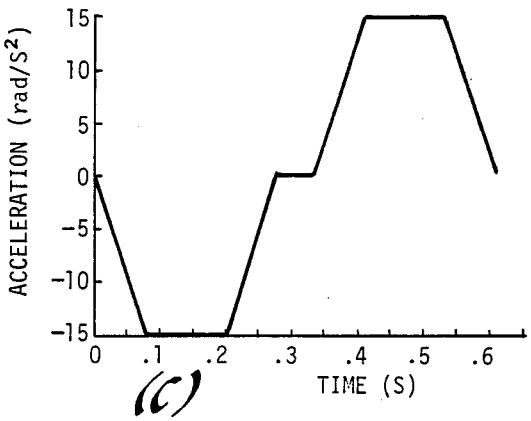
(c)
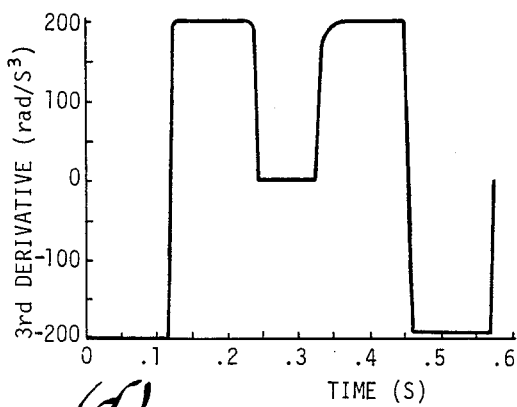
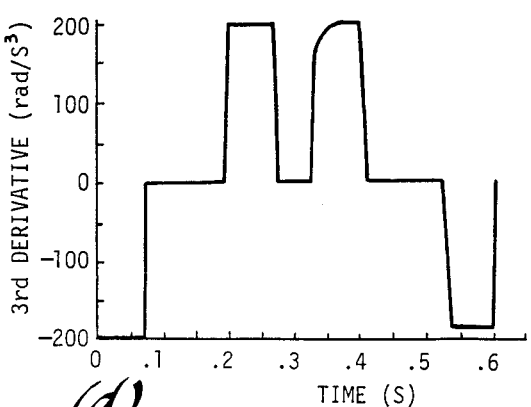
(d)
Fig. 24        Fig. 25

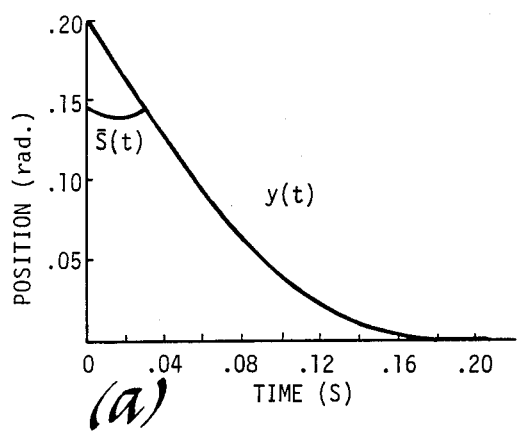
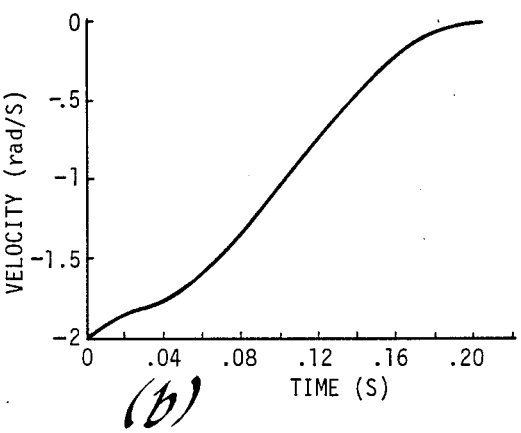
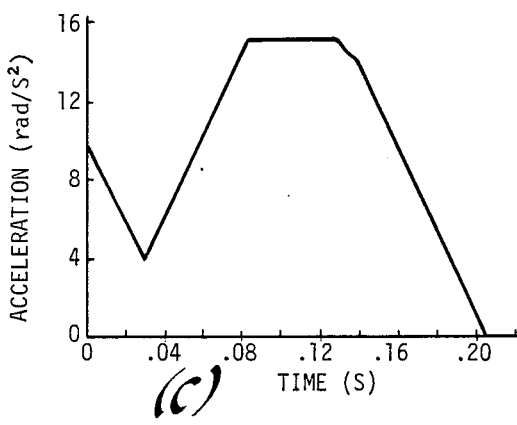
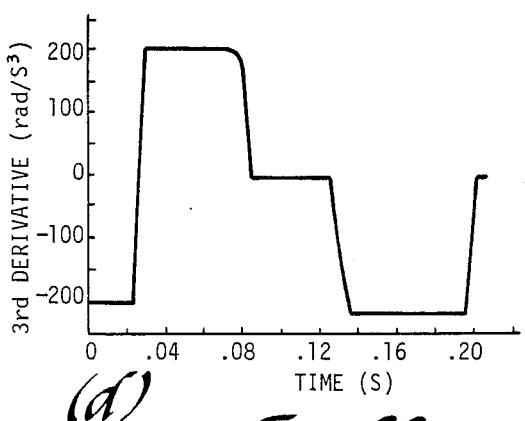
Fig. 26
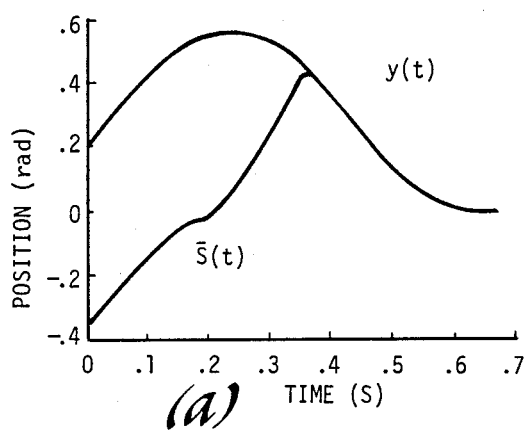
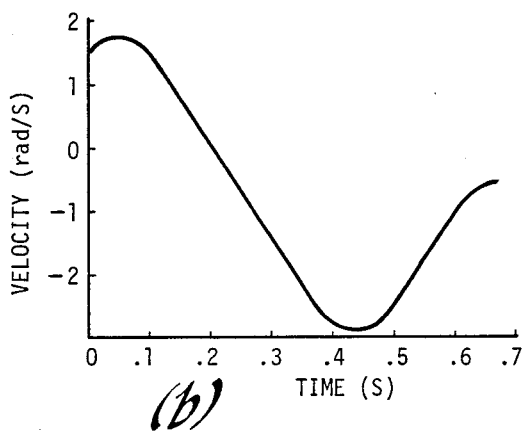
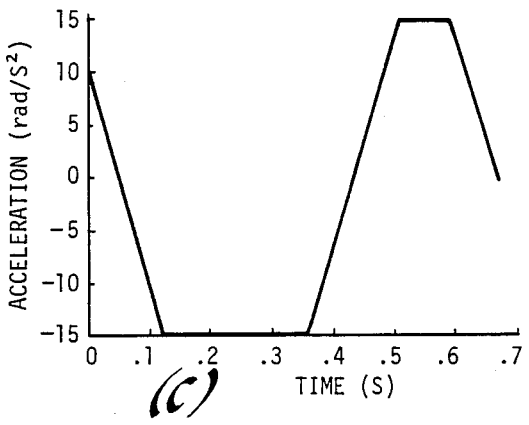
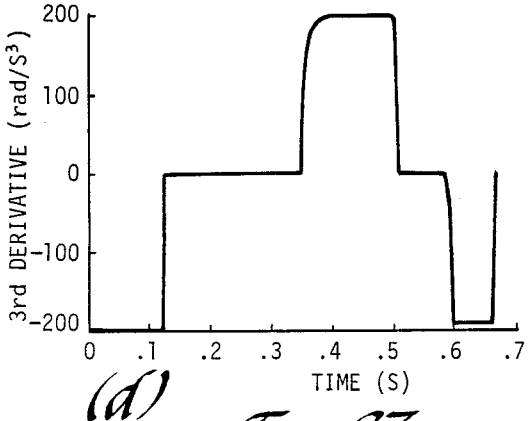
Fig. 27

MOTION CONTROL SYSTEM WITH MINIMUM TIME PATH GENERATION

This invention relates to servo systems, and more particularly, to a digital path generation and tracking method for quickly moving a control member to a commanded position with negligible following error and substantially no overshoot, independent of speed, within the servomotor capability.

Broadly, this invention pertains to a servo system of the type which moves an output member, such as a robot arm, in accordance with a target position. Functionally, this involves detecting the actual position of the output member, defining a desired trajectory or path for achieving the target position, determining an actuator command base on the position error and the desired trajectory, and activating the actuator in accordance with the actuator command. When the actuator is a DC servomotor, the actuator command is typically determined in terms of armature current or velocity and is carried out using closed-loop control techniques.

More specifically, the present invention pertains to a method and apparatus for defining the desired trajectory of the servomotor. This function is referred to herein as path generation. In a digital implementation, the trajectory or path comprises a series of successively computed command positions intermediate the initial and target positions.

In computing the trajectory positions, the dynamic capabilities of the servomotor must be considered so that the trajectory will be trackable. Generally, this is achieved by computing the positions as if they arise from command accelerations and command velocities that are within the dynamic ranges of the servomotor. For simplicity, however, the commanded acceleration is typically chosen to be discontinuous, resulting in a second-order trajectory. By definition, the second derivative of a second order path is bounded, but not differentiable.

Unfortunately, the use of second-order paths inherently leads to speed and acceleration dependent overshooting of the target position. Such overshooting typically increases in magnitude with increasing load and also with increasing commanded speed and acceleration. Overshoots are undesirble for a number of reasons, including increased wear and tear on the servo system, potential collision with nearby objects and settling time delays. They represent a deviation of the output member from the intended trajectory; the deviation is usually maintained within "acceptable" limits by imposing additional limitations on the peak speed and acceleration of the trajectory. This, of course, underutilizes the performance capabilities of the servomotor and increases the time required to achieve the desired movement.

This invention overcomes the problem of overshooting by generating a novel third-order trajectory in real time for linking the actual and target positions. The trajectory is digitally (discretely) generated and provides a substantially minimum time path for achieving the target position, subject to physically based bounds on velocity, acceleration, and rate of change of acceleration or jerk.

According to this invention, the minimum time path is generated recursively in real time. Periodically, the optimal (i.e., minimum time) third derivative, or jerk, is computed as a function of the commanded velocity, the commanded acceleration and the difference between the commanded position and the target position. Thereafter, the commanded acceleration, velocity and position are updated by integration. Motor performance related limits restrict the permissible values of jerk, acceleration and velocity. The result is a smooth, minimum time path characterized by continuous accelerations and decelerations which allow the armature current (stored energy) to smoothly rise and fall as required.

Since the path generation is recursive, no preplanning of the path is required. The target position may be changed at any time during the motion, and the path commands are automatically adjusted to produce a smooth trajectory to the new target. Moreover, the motor performance related limits are easily adjusted according to the required motion and expected (or measured) loading.

The path generation control of this invention is described herein in connection with an adaptive feedforward path following control, the subject of a co-pending patent application, assigned to the assignee of this invention.

IN THE DRAWINGS

FIGS. 2–16 are graphs referred to in the description of the theoretical path generation solution.

FIGS. 7–23 are flow diagrams representative of computer program instructions executed by the computer based servo controller of FIG. 1 in carrying out the path generation function of this invention.

FIGS. 24a to 24d, 25a to 25d, 26a to 26d, 27a to 27d, and 28a to 28d are graphs depicting the operation of the path generation function of this invention.

Figure 29:
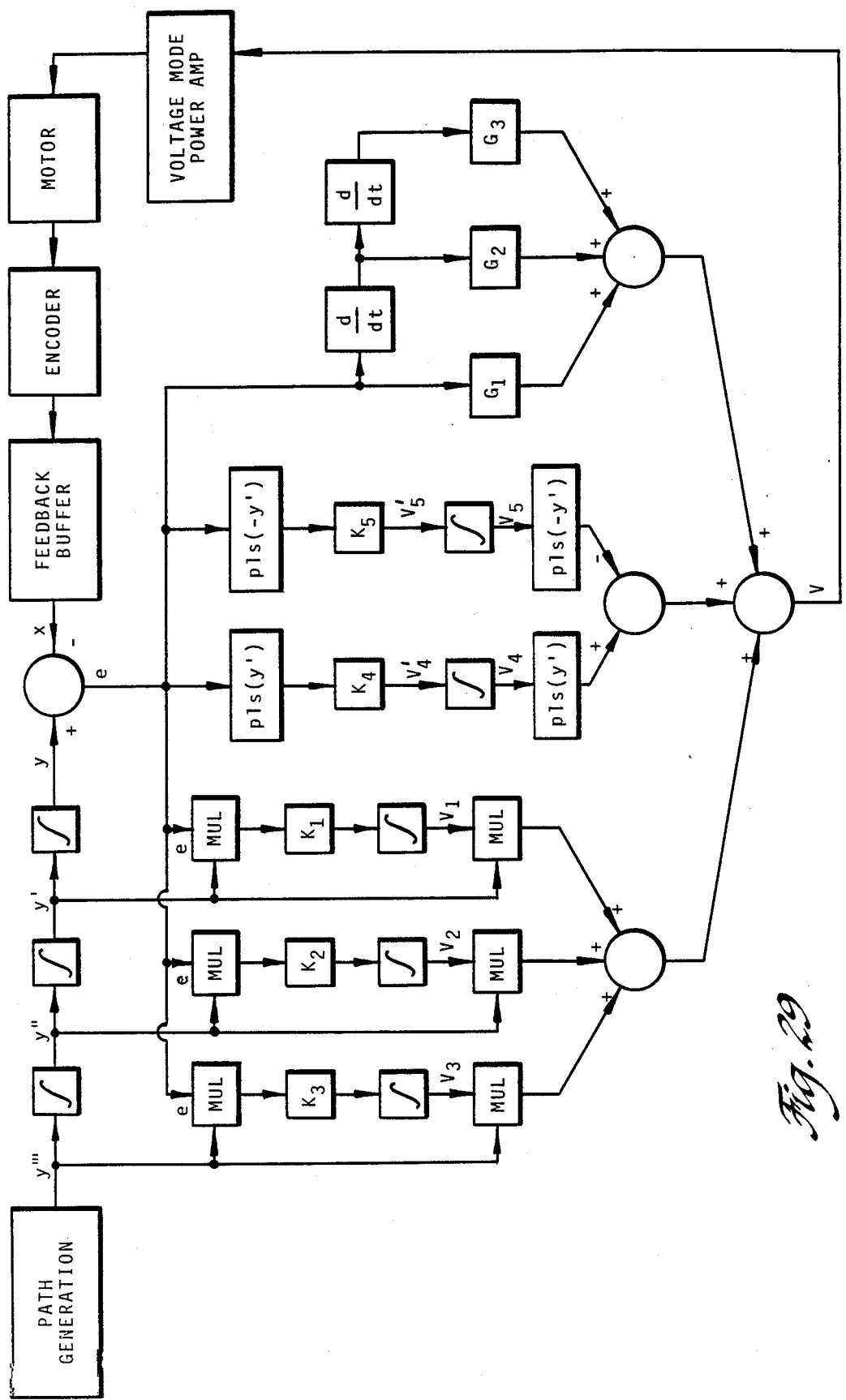

FIG. 29 is a control system diagram of the path following control.

Figure 1:
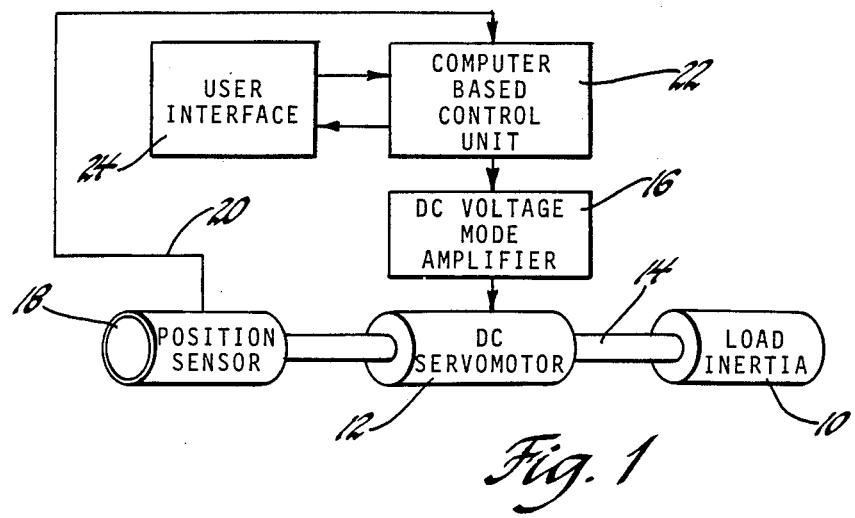
FIG. 1 is a schematic diagram of a computer based servo control system in accordance with this invention.
Figure 30:
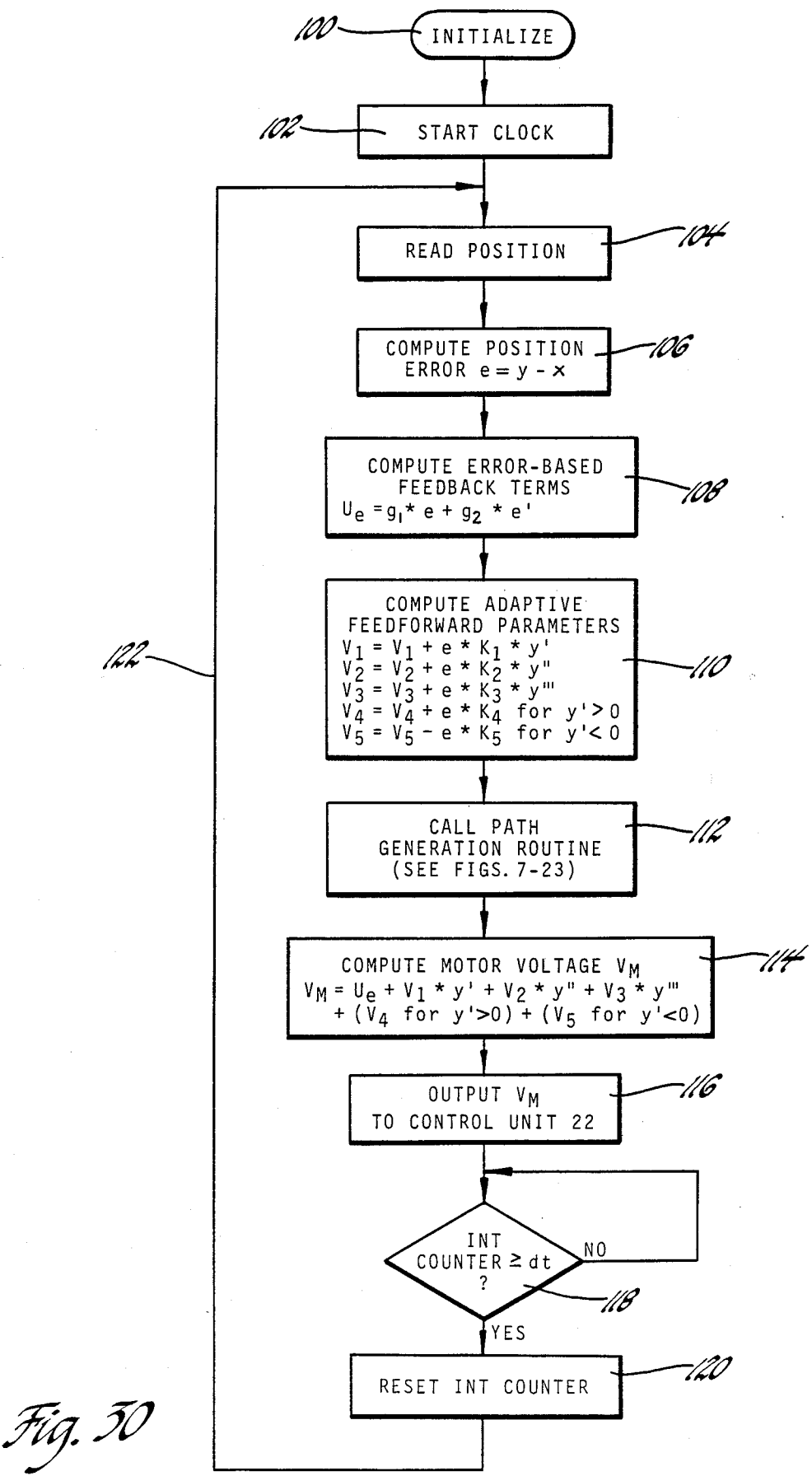

FIG. 30 is a flow diagram representative of computer program instructions executed by the computer based servo control system of FIG. 1 in mechanizing the motion control system of this invention.

FIGS. 31a and 31b depict the actual acceleration of the servo.

FIGS. 32a and 32b depict the servo end of travel oscillation.

Referring now to the drawings, and more particularly to FIG. 1, the reference numeral 10 schematically designates a positionable member of a servo system according to this invention. The positionable member 10 could take the form of an industrial robot arm, as in the illustrated embodiment, on any other position controlled member such as a plotter arm, an engine throttle, etc. A conventional DC servomotor 12 is rigidly coupled to the positionable member 10 via shaft 14 and is adapted to be energized by a DC voltage mode power amplifier 16 for effecting movement of the member 10. The motor 12 is also coupled to a position feedback sensor 18, such as a resolver or optical encoder, which provides an electrical signal indicative of the motor position on line 20.

The reference numeral 22 generally designates a computer-based control unit according to this invention for controlling the output voltage of amplifier 16 in response to the output of position sensor 18 so as to move the positionable member from an initial position to a target position at rest in minimum time with substantially no overshoot or following errors. The control unit 22 represents an aggregate of conventional elements, including a central processing unit, a crystal controlled clock, read-only and random-access memory, digital and analog input/output ports, and D/A and A/D converter channels. The control unit 22 also supports a user interface 24 such as a video display terminal to facilitate operator input of commanded positions and system parameters.

The control unit 22 performs two primary functions in carrying out the objectives of this invention—path generation and path following. Path generation refers to the derivation of a commanded trajectory in phase space between an initial position and a target position. Path following refers to the control of the motor voltage for effecting movement of the positionable member 10 in accordance with the desired trajectory. Since the path generation routine is recursive, the control unit 22 periodically performs both functions while moving the positionable member 10. In each execution period, the path generation routine updates the desired path, and the path following routine determines the required motor voltage for accurate following of the path.

The trajectory developed by the path generation function of this invention can be advantageously implemented in connection with a different and conventional path following routine. As indicated above, it is illustrated herein in connection with an adaptive feedforward path following routine that is the subject of a co-pending patent application. The path generation and path following functions are separately addressed below prior to a discussion of the illustrated embodiment wherein both functions are implemented by the single computer-based control unit 22.

Third-order Path Generation

As with any good path, the third-order path y for the servo system of this invention must be within the capabilities of the servomotor. The limits of the servomotor are defined by velocity, acceleration and jerk limits, V, A and W, respectively. The velocity limit V arises from the motor voltage limit and the acceleration limit A arises from the motor current limit. The jerk limit W arises from the ability of the servo system to tolerate mechanical compliance and the ability of the power source to supply the demanded rate of change of current. In addition to not violating motor and supply performance limitations, however, the path according to this invention must minimize the transit time to a specified target position and hit the target position at rest. Given that T is the total transmit time and t the instantaneous time, the problem can be stated algebraically as follows.

Minimize T such that: $y(T)=$ target position Y, $y'(T)=y''(T)=0$, $|y'(t)| \leq V$, $|y''(t)| \leq A$, and $|y'''(t)| \leq W$ for $0 \leq t \leq T$, and for prespecified bounds of V, A and W.

Applying conventional control theory, the time T can be minimized with bang-bang control of $y'''$. That is, $y'''$ assumes its maximum value W, its minimum value $-W$, or a zero value. Algebraically:

$$y'''(t) = \begin{matrix} +W, \\ 0, \\ -W \end{matrix} \text{ or}$$

depending on $y(t)$, $y'(t)$ and $y''(t)$. The theory also indicates that there are at most two switches between $+W$ and $-W$ in any given solution. See Lee and Markus, *Foundations of Optimal Control Theory*, John Wiley and Sons, Inc. 1968, incorporated herein by reference.

A discussion of the theoretical solution, entitled, "A New Approach to Minimum Time Robot Control", was authored and published by the inventor hereof in the *Proceedings of the Winter Annual Meeting of the ASME*, Nov. 17-22, 1985, *Robotics and Manufacturing Automation*, PED Vol. 15, also incorporated herein by reference.

The bang-bang form of the minimum time solution means that the $(y, y', y'')$ phase space can be divided into three regions: one in which $y'''(t)=+W$, one in which $y'''(t)=0$ and one in which $y'''(t)=-W$. The term $y'''(t)$ is zero whenever the velocity limit V or the acceleration limit A is controlling.

Treating first the condition for which $y'''=+W$ and assuming the initial position $y=y_0$, the initial velocity $y'=y_0'$ and initial acceleration $y''=y_0''$, successive integration of $y'''$ yields:

$$y''(t)=y_0''+(Wt), \quad (1)$$

$$y'(t)=y_0'+(y_0''t)+(Wt^2/2), \text{ and} \quad (2)$$

$$y(t)=y_0+(y_0't)+(y_0''t^2/2)+(Wt^3/6). \quad (3)$$

Figure 2:
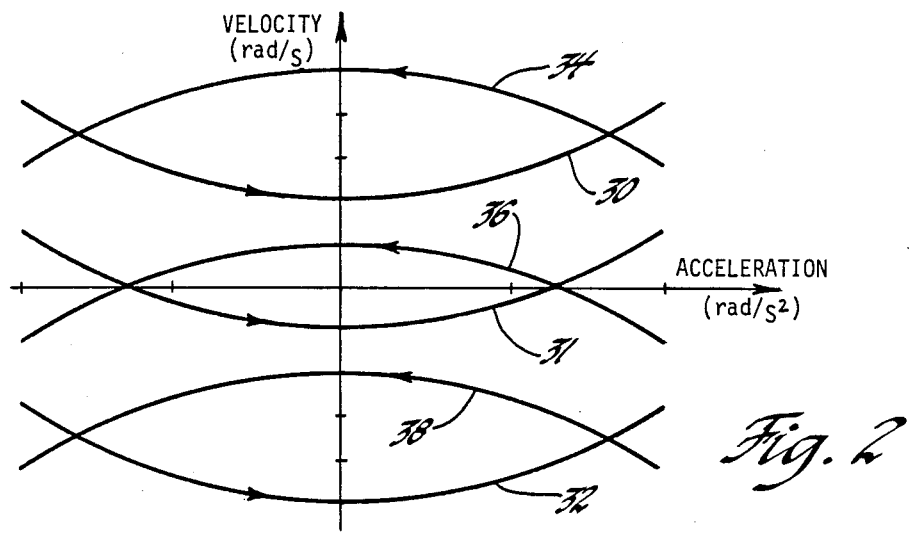

Combining expressions (1) and (2) and representing the initial conditions as a constant K yields:

$$y'=(y''^2/2W)+K \quad (4)$$

which defines a family of concave upward parabolas in the $(y'', y')$ plane, as graphically depicted by the traces 30-32 in FIG. 2. Since $y'''>0$, $y''$ is increasing and the parabolas are traversed from left to right as indicated.

Since $|y'|$ must be less than or equal to the motor velocity limit V, the lower constraint $y' \geq -V$ in the $(y'', y')$ plane is given by the expression:

$$y'=(y''^2/2W)-V \quad (5)$$

This is the parabola 32 of FIG. 2 which intersects the point $y'=-V$.

A similar analysis for the condition of $y'''=-W$ yields the expression: W $$y'=-(y''^2/2W)+K \quad (6)$$

which defines a family of concave downward parabolas in the $(y'', y')$ plane, as graphically depicted by the traces 34-38 in FIG. 2. Since $y'''<0$, $y''$ is decreasing and the parabolas are traversed from right to left as indicated.

In this case $(y'''=-W)$, the velocity constraint $y' \leq +V$ results in the upper limit in the $(y''', y')$ plane as given by the expression:

$$y'=-(y''^2/2W)+V \quad (7)$$

This is the parabola 34 of FIG. 2 which intersects the point $y'=+V$.

When the parabolas 32 and 34 are combined with the constraint that $|y''|$ be less than or equal to the motor acceleration limit A, a region D of permissible combinations of $y'$ and $y''$ is defined. This region is graphically depicted in FIG. 3, where the upper boundary is given by the parabola 34, the lower boundary is given by the parabola 32, the left-hand boundary is given by the acceleration limit of $y''=-A$, and the right-hand boundary is given by the acceleration limit of $y''=+A$. The region D thus represents a path limitation based on the physical constraints of the servo system. It can be expressed mathematically as follows:

$$D=[(y'',y'):y''^2/2W-V\leq y' \text{ and } y'\leq V-y''^2/2W, |y''|\leq A] \quad (8)$$

The acceleration-based limits are linear at $y''=\pm A$, but the velocity-based limits are not since they are related to acceleration. Once a point 1 on the upper boundary is hit (as by the path 40), the maximum rate of deceleration ($y'''=-W$) must be invoked to avoid exceeding the velocity limit V. The acceleration is zero when the velocity limit V is actually reached at point 2. A similar analysis applies to the lower boundary.

Figure 3:
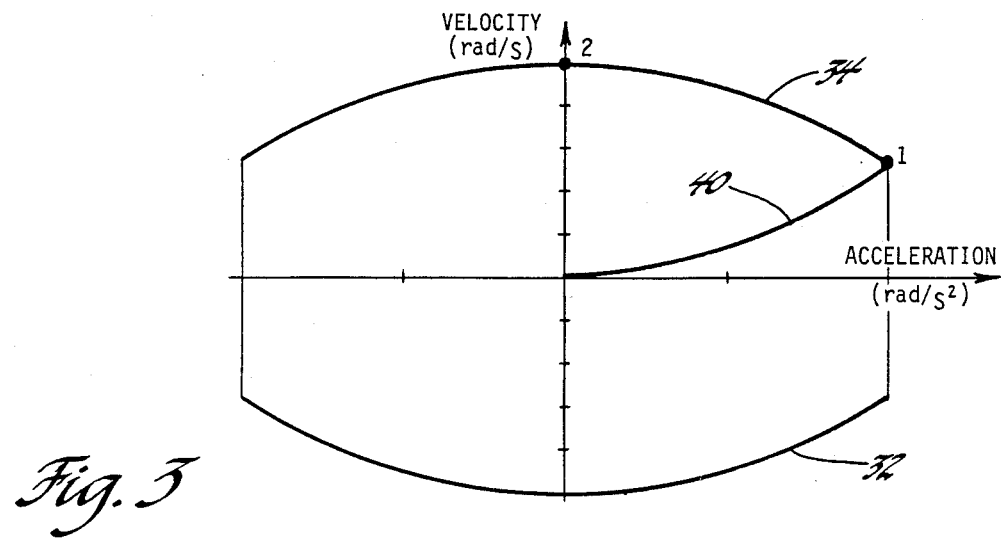

The main objective of path generation is to define the minimum time path, realizing that the physical constraint region of FIG. 3 may operate to alter the optimum trajectory. To hit a target position Y at rest, the path y must traverse a parabola, in the (y'', y') plane, intersecting the point $y'=y''=0$. The final conditions are given by $y(T)=Y$ and $y'(T)=y''(T)=0$. The general solution to this constraint is obtained by the combining the expressions (1) and (2), and substituting into expression (3) for $y'''=\pm W$, yielding the expressions:

$$y'=-(y''|y''|)/2W, \text{ and} \quad (9)$$

$$y=Y+(y''^3/6W^2) \quad (10)$$

Figure 4:
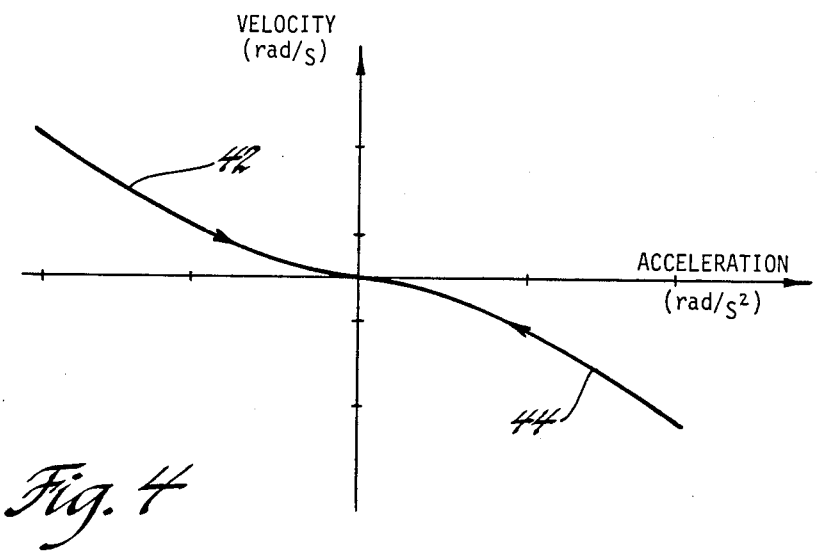

Expressions (9) and (10) define a "final approach" curve C in the (y'', y', y) phase space containing the set of all points (y'', y', y) which can be steered to the target of y=y at rest with $y'''=\pm W$. A graphical representation of the curve C projected into the (y'', y') phase plane is given in FIG. 4. The curve C is effectively split into two disjoint regions: a C+ region designated by the trace 42 and a C− region designated by the trace 44. The C− region represents a final approach curve for hitting the target position Y at rest with $y'''=-W$; the C+ region represents a final approach curve for hitting the target position Y at rest with $y'''=+W$.

Figure 5:
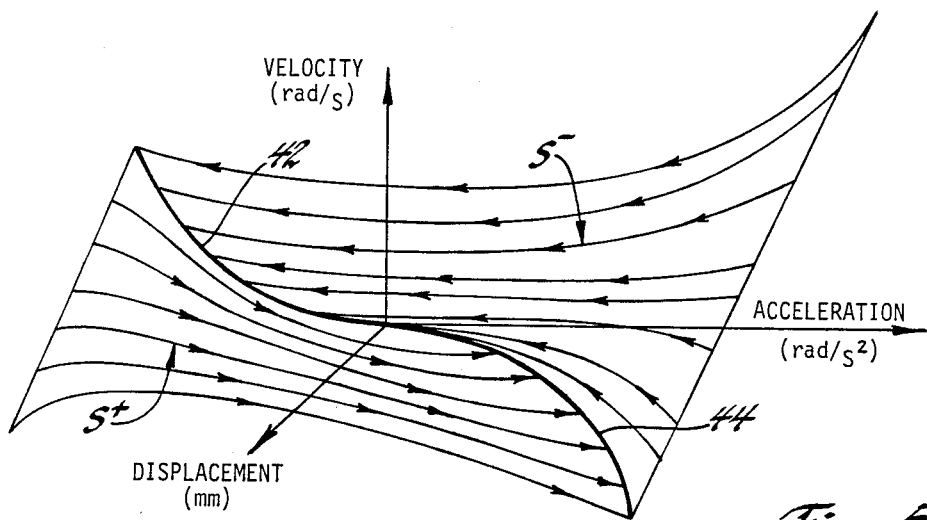

The surface S+ is defined as the set of all points (y'', y', y) which can be steered to the curve C− with $y'''=+W$, and a surface S− as the set of all points (y'', y', y) which can be steered to the curve C+ with $y'''=-W$. In either case, the sign of the term y''' is switched when the respective region of the C curve is hit. The surface S and its relationship to the curve C is graphically depicted in FIG. 5.

Mathematically, the surface S+ can be defined as the set of all points (y'', y', y) such that:

$$y=Y+(y''^3/6W^2)-y'[(y''^2/2W^2)-(y'/W)]+W\cdot[(y''^2/2W^2)-(y'/W)]^{3/2} \text{ if} \quad (11)$$

$$[y'+y''|y''|/2W]<0 \text{ or } [y'+y''|y''|/2W]=0 \text{ and } y''\leq 0. \quad (12)$$

Similarly, the surface S− can be defined as the set of all points (y'', y', y) such that:

$$y=Y+(y''^3/6W^2)-y'[(y''^2/2W^2)+(y'/W)]-W\cdot[(y''^2/2W^2)+(y'/W)]^{3/2} \text{ if} \quad (13)$$

$$[y'+y''|y''|/2W]>0 \text{ or } [y'+y''|y''|/2W]=0 \text{ and } y''\geq 0. \quad (14)$$

Since the minimum time solution requires, at most, two switches of y''' between +W and −W, it follows that for points above the surface S, $y'''=-W$ should be used until the S+ surface is hit. In such case, $y'''=+W$ would then be used on the S+ surface until the curve C− is hit, whereafter $y'''=-W$ would be used until the target Y is hit. Similarly, for points below the surface S, $y'''=+W$ should be used until the S− surface is hit. In such case, $y'''=-W$ would be then be used on the S− surface until the curve C+ is hit, whereafter $y'''=+W$ would be used until the target Y is hit.

The remainder of the theoretical solution is directed toward defining y''' (that is, +W, −W, or 0) in terms of the expressions for the surface S, the curve C and the region D. Intuitively, and from expressions (11)–(14), the proximity of a point (y'', y', y) to the surface S for any given target position Y, depends on y'', y' and y−Y; that is, the acceleration, the velocity and the relative distance to the target. The objective, then, is to define y''' in the form:

$$y'''=f(y-Y, y', y'') \quad (15)$$

In view of the above, and without regard to velocity and acceleration constraints V and A, we can define y''' as follows:

$$y''' = f(y - Y, y', y'') = +W \text{ where} \quad (16)$$

(y'', y', y) lies below S, or (y'', y', y) lies on S+, or (y'', y', y) lies on C+ and $$y''' = f(y - Y, y', y'') = -W \text{ where} \quad (17)$$

(y'', y', y) lies above S, or (y'', y', y) lies on S−, or (y'', y', y) lies on C−

The curve C and surface S have been defined assuming that, once the trajectory is on the surface S, the acceleration limit cannot be violated. This condition is graphically illustrated in FIG. 6, which depicts the (y'', y') projection of a representative trajectory 46 and a final approach C curve 48/50 which intersects parabolic upper and lower limits 34 and 32 of the D region. Assuming an initial at rest position below the surface S, and $y'''=+W$, the trajectory 46 increases in velocity and acceleration until the surface S− is hit at point 1. Thereafter, $y'''=-W$ is used and the trajectory 46 follows the surface S− until it hits the final approach C curve 48. When the intersection occurs, the term y''' is switched to +W and the trajectory follows the projected C curve 48 to the target position.

Due to the relationship between the projected C curve 48 and the D region, no trajectory within the upper and lower limits 34 and 32 will violate the acceleration limit $y''=\pm A$. This relationship can be guaranteed by suitably limiting the value of W—specifically, the product WV must be less than or equal to $A^2$. However convenient, the employment of such a limitation is generally not desirable since it increases the time required to hit a target position.

Figure 6:
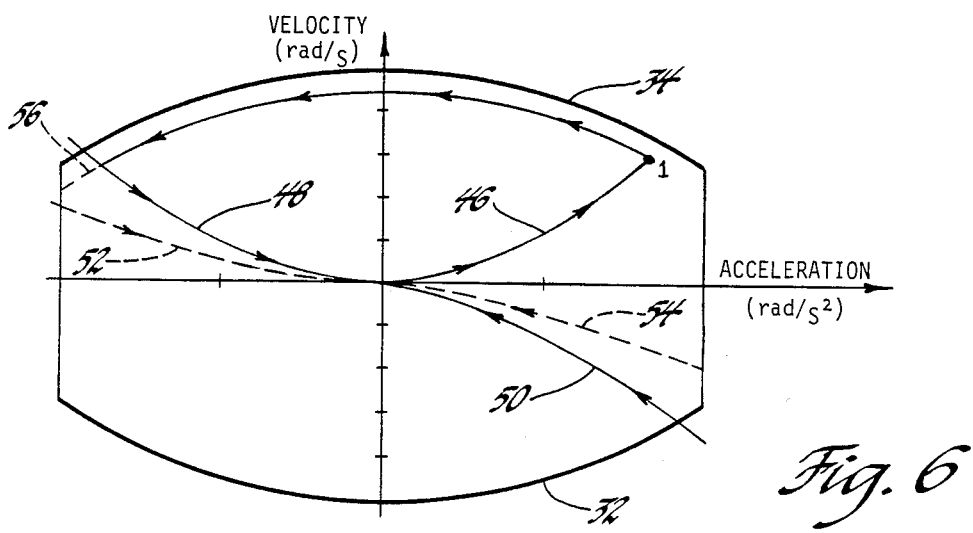
Figure 7:
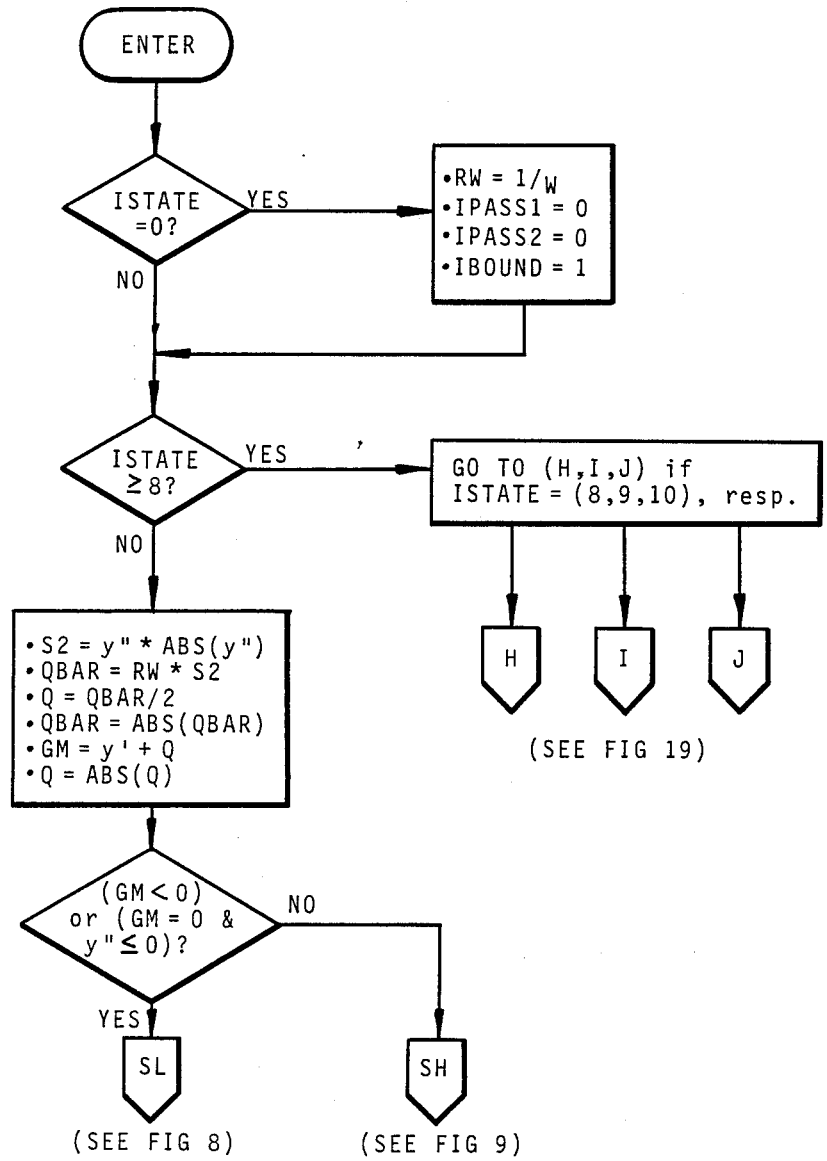

With a larger value of W (that is, $WV>A^2$), the projected C curve flattens and intersects the acceleration limits of the D region, as depicted by the broken trace 52/54. In such case, the acceleration limit A may be encountered before the trajectory hits the C curve, as depicted in FIG. 6 by the broken trace 56. When this happens, the term $y'''$ must be set equal to zero to prevent a violation of the limit, and the trajectory follows the vertical acceleration limit before hitting and following the final approach C curve 52 to the target position.

The limit situation described above is handled, according to this invention, by (1) modifying the C curve to form a new curve designated as C and (2) modifying the S surface to form a new surface designated S. The modified projected curve C includes a parabolic segment, as in the normal curve C, and a vertical segment created by the acceleration limit A. The modified surface S represents the set of all points $(y'', y', y)$ which can be steered to the modified curve C with $y''' = \pm W$.

As indicated above, the acceleration limit will only be encountered enroute to the C+ curve if the product $WV > A^2$, where V is the maximum velocity attained with $y''' = -W$. Since the parabolic trajectories in the $(y'', y')$ plane under $y''' = -W$ are of the form:

$$y' + (y'')^2/2W = \text{constant}$$

—see expression (7)—where the constant is the maximum velocity attained with $y''' = -W$, the acceleration limit will be encountered if $$W[y' + (y'')^2/2W] > A^2 \quad (18)$$

From expressions (9) and (10), the intersection of the previously defined curve C+ with the acceleration limit of $y'' = A$ is given by the expressions:

$$y' = A^2/2W, \text{ and} \quad (19)$$

$$y = -A^3/6W^2. \quad (20)$$

The vertical segment of the modified projected curve C+, then, corresponds to the set of points $(y'', y', y)$ which can be steered to the intersection point defined by the expressions (19) and (20), with $y'' = -A$ and $y''' = 0$. Integrating $y'' = -A$ to find $y'$ and $y$, and substituting the terms $y'$ and $y''$ from expressions (19) and (20), yields an expression for the vertical segment as follows:

$$y = -A^3/24W^2 - y'^2/2A \quad (21)$$

Summarizing, the modified C+ curve can be defined as the set of all points $(y'', y', y)$ such that:

$$y' = -y''|y''|/2W, \text{ and}$$

$$y = y''^3/6W^2$$

for $y'' \leq 0$ and $W(y' + y''^2/2W) \leq A^2$    parabolic segment and $$y'' = -A,$$

$$y' \geq A^2/2W, \text{ and}$$

$$y = -A^3/24W^2 - y'^2/2A$$

for $W(y' + y''^2/2W) \geq A^2$.    vertical segment

A similar analysis will show that the modified C− curve can be defined as the set of all points $(y'', y', y)$ such that:

$$y' = -y''|y''|/2W, \text{ and}$$

$$y = y''^3/6W^2$$

for $(y'' \geq 0)$ and $W(y' - y''^2/2W) \leq -A^2$    parabolic segment and $$y'' = A,$$

$$y' \leq -A^2/2W, \text{ and}$$

$$y = A^3/24W^2 + y'^2/2A$$

for $W(y' - y''^2/2W) \leq -A^2$.    vertical segment

As indicated above, the modified surface S− is the set of all points $(y'', y', y)$ which can be steered to the modified curve C+ with $y''' = -W$. If $$W(y' + y''^2/2W) \leq A^2$$

is satisfied, the acceleration limit A will not be encountered and the unmodified surface S− is valid. However, if $$W(y' + y''^2/2W) \geq A^2$$

is satisfied, the acceleration limit A will be encountered and the surface S− has to be modified (S−) to represent the set of all points that can be steered to the vertical segment of curve C+ with $y''' = -W$.

Given the condition that $y''' = -W$, integration to find $y''$, $y'$ and $y$ yields:

$$y''(t_c) = y_0'' - Wt_c \quad (22)$$

$$y'(t_c) = y_0' + y_0''t_c - Wt_c^2/2, \text{ and} \quad (23)$$

$$Y(t_c) = y_0 + y_0't_c + y_0''t_c^2/2 - Wt_c^3/6 \quad (24)$$

where $t_c$ is the time at which the trajectory hits the modified curve C+. Since $y''(t_c) = -A$, $$t_c = (y_0'' + A)/W, \text{ and} \quad (25)$$

$$y(t_c) = -A^3/24W^2 - y'(t_c)^2/2A \quad (26)$$

Combining expressions (22)–(26) and suppressing the initial condition subscript yields an expression for the modified surface S− as follows:

$$y = -(A^3/24W^2) - (y'^2/2A) - (Wy't_c^2/2A) + (Wt_c^3/6) - (W^2t_c^4/8A), \quad (27)$$

where $t_c$ is given by:

$$t_c = (A + y'')/W \quad (28)$$

A similar analysis in relation to the modified curve C− reveals that the modified surface S+ is given by the expression:

$$y = (A^3/24W^2) + (y'^2/2A) - (Wy't_c^2/2A) - (Wt_c^3/6) + (W^2 t_c^4/8A), \quad (29)$$

where $t_c$ is given by the expression:

$$t_c = (A - y'')/W \quad (30)$$

Unfortunately, the theoretical solution derived above is not adapted for direct mechanization in a digital, or discrete sampled, system. The difficulty lies in detecting the exact intersection of the trajectory with the surfaces, curves and constraints and which $y'''$ must be changed. This is true with respect to the surface S, the curve C and the constraint surfaces of region D. Since a digital system operates at a discrete time update rate, the exact moment of a surface crossing will not, in all probability, coincide with a sample time. For example, if the system has a sample interval of dt seconds and y is above the surface S, the switch of $y'''$ from $+W$ to $-W$ will likely occur late (up to dt seconds) and the trajectory of ($y''$, $y'$, $y$) will overshoot the surface S. In other words, the triple ($y''$, $y'$, y—Y) will lie either above or below the surface S following the switch. Potentially, this results in a limit cycle in the path position y as $y'''$ alternates between $-W$ and $+W$—an unacceptable mode of operation.

The operation described above is avoided, according to this invention, through an approximation of the path expressions which achieves the objective of hitting the target Y at rest without violating the system constraints. In addition, the number of calculations per time step is minimized to facilitate real time generation of the path.

In the digital implementation according to this invention, the terms y, $y'$, $y''$, $y'''$ are updated every dt seconds. It is assumed that $y'''$ is constant over each dt second interval between samples. For a given value of $y'''(t)$, the terms $y''(t+dt)$, $y'(t+dt)$ and $y(t+dt)$ can be found by integration as follows:

$$y''(t+dt) = y''(t) + dt\, y'''(t), \quad (31)$$

$$y'(t+dt) = y'(t) + dt\, y''(t) + dt^2 y'''(t)/2, \quad (32)$$

$$y(t+dt) = y(t) + dt\, y'(t) + (dt)^2 y''(t)/2 + (dt)^3 y'''(t)/6. \quad (33)$$

When ($y''$, $y'$, y—Y) lies below S, the term $y'''$ is set equal to $+W$. If $y'''$ were switched to $-W$ after the intersection with the surface S, an overshoot would occur. If $y'''$ were switched to $-W$ prior to the intersection with the surface S, the triple ($y''$, $y'$, y—Y) would remain below the surface S and parallel thereto. This apparent dilemma is overcome, according to this invention, by a technique which predicts the occurrence of surface crossings and suitably adjusts the value of $y'''$.

At any sample time dt, we assumed that we have already computed y(t), $y'(t)$ and $y''(t)$, by expressions (31)–(33). Therefore, at a sample time dt, the terms $y'(t)$ and $y''(t)$ are used to compute a trajectory intersection point S(t) on the target surface S. If y(t)<S(t), the trajectory is below the surface S, and $y'''$ should be $+W$ unless no overshoot will occur in the next interval dt.

According to a first embodiment of this invention, the likelihood of an overshoot occurring is determined by computing y(t+dt) and S(t+dt) with $y'''=+W$. If y(t+dt)≦S(t+dt), no surface overshoot will occur and the term $y'''(t)$ may remain at $+W$. If y(t+dt)>S(t+dt), an overshoot is imminent. In such case, $y'''(t)$ is modified and the terms y(t+dt), $y'(t+dt)$ and $y''(t+dt)$ recomputed. Unfortunately, this approach requires two calculations of the surface S per time interval, which may present too great a burden for a controller of limited computational capability.

According to a second embodiment of this invention, past values of S and y are used to predict future ones. Using second order approximations:

$$S(t+dt) = (5/2)S(t) - 2S(t-dt) + (\tfrac{1}{2})S(t-2dt) \quad (34)$$

$$y(t+dt) = (5/2)y(t) - 2y(t-dt) + (\tfrac{1}{2})y(t-2dt). \quad (35)$$

With either embodiment, the term $y'''$ must be switched from $+W$ if y(t+dt)≧S(t+dt) in order to avoid an overshoot of the surface S. According to this invention, the term $y'''(t)$ is modified by an amount designated herein as DEL to correct for the position error, $e_s(t)$, where $e_s(t)$ is defined according to the expression:

$$e_s(t) = y(t) - S(t) \quad (36)$$

For points below the surface S, $y'''(t)$ may thus be defined as:

$$y'''(t) = -W + DEL \quad (37)$$

The term DEL is defined such that the rate of change in error $e_s'(t)$ surfaces S and the trajectory y is approximately proportional to $e_s(t)$, with a constant proportionality factor. With this constraint, error $e_s(t)$ decays approximately exponentially, beginning at the sample interval dt for which an impending overshoot is detected. If $t_s$ is defined as a time between sample intervals—that is, t≦$t_s$≦t+dt—the error characteristic may be expressed algebraically as follows:

$$e_s'(t_s) = -G\, e_s(t), \quad (38)$$

and by integration, $$e_s(t+dt) = (1 - G\, dt)e_s(t) \quad (39)$$

where G is the constant rate. Projected over an integral number n of intervals dt, the error $e_s(t+ndt)$ may be expressed as follows:

$$e_s(t+ndt) = (1 - G\, dt)^n e_s(t). \quad (40)$$

In other words, the error $e_s(t)$ decays at an exponential rate $(1-G\, dt)$.

With the above objective in mind, an expression for DEL is derived by relating the rate of change of error $e_s'(t)$ to the surface and trajectory terms. It follows from expression (35) that:

$$e_s'(t) = y'(t) - S'(t) \quad (41)$$

For $W(y' + y''^2/2W) \leq A^2$, the velocity and acceleration constraints are not encountered and the unmodified surface S− of expression (13) is valid. Differentiating expression (13) and setting $y'''(t) = (-W + DEL)$, yields an expression of $S'(t)$ as follows:

$$S'(t) = y'(t) - DEL[y''^2/W^2 + y'/W + (3y''/2W)(y''^2 2W^2 + y'/W)^{\tfrac{1}{2}}] \quad (42)$$

Rearranging and combining expressions (36) and (38) yields an expression for DEL as follows:

$$DEL = -G \, e_s(t)/[y''^2/W^2 + y'/W + (3y'/2W)(y''^2W^2 + y'/W)^{\frac{1}{2}}] \quad (43)$$

In practice, we have achieved good results with $(1-G\,dt) = 1/8$. In other words, G is chosen such that the product $G\,dt = \frac{1}{2}$. Functionally, this means that for each interval dt, the error $e_s(t)$ will be reduced by a factor of two.

For $W(y' + y''^2 2W) \geq A^2$, the modified surface S must be used. Using a derivation analogous to that described above, the term DEL can be expressed as follows:

$$DEL = -G \, e_s(t)/[(x/A)^*(y' + xy''/2)] \quad (44)$$

where x is defined as:

$$x = (1/W)(y'' + A) \quad (45)$$

Summarizing, when y begins below S and an overshoot either is about to occur or has occurred, the term y''' is switched from +W to (−W+DEL), the term DEL being given by expression (42) when $$W(y' + y''^2/2W) \leq A^2$$

and by expression (43) when $$W(y' + y''^2/2W) > A^2.$$

Similarly, if y has been above the surface S, then a surface crossing between times t and t+dt—that is, $y(t+dt) \leq S(t+dt)$—can be anticipated as explained above. If an impending surface crossing is found, the term y''' is switched from $$y''' = -W$$

to $$y'''(t) = +W + DEL.$$

Expressions for the term DEL are derived in a manner analogous to that described above with respect to trajectories initially above the the surface S. The expressions for the term DEL relative to trajectories initially below the surface S for the conditions $W(y' - y''^2/2W) \leq -A^2$ and $W(y' - y''^2/2W) > -A^2$ are set forth below.

$$DEL = -G \, e(t)/[y''^2/W^2 - y'/W - (3y''/2W)(y''^2/2 - y'/W)^{\frac{1}{2}}[ \quad (46)$$

for $W(y' - y''^2/2W) > -A^2$ and $$DEL = -G \, e(t)/[-x(y' + xy''/2)/A] \quad (47)$$

where $x = (1/W)(A - y'')$, for $W(y' - y''^2/2W) \leq -A^2$.

A similar control problem occurs with respect to the curve C once the trajectory is on the surface S. As with the approach to the surface S, the objective is to avoid an overshoot of the curve C. The solution to the problem of hitting the curve C is similar to that of hitting the surface S, in that the value of y''' is modified to assume a value between +W and −W. However, the expressions for curve C are much easier to compute than the expressions for surface S, enabling the control unit 22 to employ a more exact solution.

First, it is assumed that the trajectory is on the surface $S^-$ *and approaching curve* $C+$. It is further assumed that $W(y'+y''^2/2W) \leq A^2$—that is, the velocity and acceleration constraints are not encountered and the expression (9) for the unmodified curve C is valid.

Defining a term Q(t) as:

$$Q(t) = y'(t) - y''(t)^2/2W$$

it follows that $Q(t) = 0$ when the trajectory is on the curve C. Evaluating the expression $Q(t+dt)$ provides an indication of impending overshoot. If the trajectory is on the surface $S^-$ and $Q(t+dt)$ is less than zero, an impending overshoot is detected. If $Q(t+dt)$ is greater than zero, no overshoot will occur prior to time (t+dt). The expression for $Q(t+dt)$ is as follows:

$$Q(t+dt) = y'(t+dt) - y''(t+dt)^2/2W$$

Rearranging, $$Q(t+dt) = Q(t) + [1 - y'''(t)/W]^* [dt\,y''(t) + dt^2 y'''(t)/2]. \quad (48)$$

Assume that in a given interval, an evaluation of $Q(t+dt)$ indicates that an overshoot of the curve C is imminent with $y'''(t) = -W$. If y''' is immediately switched to +W, $$Q(t+dt) = Q(t)$$

which is assumed to be positive. For $y''' = -W$ $$Q(t+dt) = Q(t) + 2[y''(t)dt - W\,dt^2/2]$$

which is assumed to be negative. Thus, for some value of y''' between −W and +W $$Q(t+dt) = 0.$$

That value of y''' is identified, in the illustrated embodiment, by a secant approximation, regarding Q as a function of y'''. While other methods including Newton's approximation or direct quadratic solution are available, the secant approximation is preferred because it is inherently stable and economizes on real time calculations.

In the secant approximation, P(w) is defined as:

$$P(w) = Q(t+dt)$$

for $y'''(t) = w$ and $-W \leq w \leq +W$.

The secant approximation to $z = P(w)$ in the region $-W \leq w \leq +W$ is expressed as follows:

$$\frac{z - P(-W)}{w + W} = \frac{P(W) - P(-W)}{2W}$$

Solving for w when $z = 0$ yields an approximation to the root $P(w) = 0$:

$$w = \frac{-W[P(W) + P(-W)]}{P(W) - P(-W)} \quad (49)$$

Substituting P(−W) and P(+W) into expression (49) yields the value w for y''' between −W and W that interpolates to the curve C:

$$y'''(t) = -W[Q(t) + y''(t)dt - W^2 dt^2/2]/[-y'(t)dt + W dt^2/2] \quad (50)$$

Improved accuracy can be obtained, either by repeating the secant approximation using (49) as a new endpoint or by using $$P(0) = Q(t) + y''(t)dt$$

as one endpoint of the interpolation. That is, if $P(0) > 0$, then $P(0)$ and $P(-W)$ are used to determine the secant; if $P(0) < 0$, then $P(0)$ and $P(+W)$ are used to determine the secant. A similar analysis yields analogous formulas for hitting $C^-$ from $S^+$ when $W(y' - y''^2/2W) \geq -A^2$.

The approach to any curve in phase space or in the $(y', y'')$ phase plane can be handled in the same manner. For example, if the trajectory is on $S^-$ with $W(y' + y''^2/2W) > A^2$, then the portion of $C^+$ that will be hit is the line $y'' = -A$. This can be tested at time t by checking the inequality $$y''(t) - Wdt \leq -A \quad (51)$$

If expression (51) is satisfied, $y'''$ must be switched from $-W$ to a new value. In this case, interpolation is not necessary and $y'''$ is determined according to the expression:

$$y'''(t) = [y''(t) + A]/dt$$

In subsequent intervals, $y'''$ is set equal to zero until it is determined that the trajectory would overshoot the curve $C^+$ with $y''' = 0$. Then, the trajectory is interpolated to the $C^+$ curve using the secant approximation described above.

Once the trajectory is on the $C^+$ curve, the target $y = Y$ must be hit at rest. However, due to the sampled time (digital) approach, maintaining $y''' = +W$ will not, in all probability, result in the trajectory hitting the target position at rest.

According to the illustrated embodiment of this invention, the final approach curve C is simulated with a cubic approximation which permits the trajectory to hit the target position $y = Y$ at rest with a constant value of $y'''$ in an integral number of time steps, N. Assume that when the trajectory hits the curve $C^+$ as described above at time t, the position is $y(t)$, the velocity is $y'(t)$ and the acceleration is $y''(t)$. For a positive real number x, INT[x] is defined as the largest integer less than or equal to x. The term N is defined as follows:

$$N = INT[|(y''(t)/Wdt)| + 0.5] \quad (52)$$

For $K = 1, 2, \ldots, N$, let:

$$t_K = Kdt, \text{ and} \quad (53)$$

$$x = -6(y - Y)/N^3 dt^3. \quad (54)$$

While on final approach to the target $y = Y$, the quantity x in expression (54) is the third derivative of the cubic polynomial p(t), such that $$p(t) = y(t)$$

$$(dp/dt)(t + Ndt) = (d_2/dt)(p_2)(t + Ndt) = 0, \text{ and}$$

$$p(t + Ndt) = Y.$$

Enroute to the target $y = Y$ along the final approach cubic, $$y''(t + Kdt) = -X(t_N - t_K), \quad (55)$$

$$y'(t + Kdt) = -(\tfrac{1}{2})y''(t + Kdt)(t_N - t_K), \text{ and} \quad (56)$$

$$y(t + Kdt) = Y - (\tfrac{1}{3})y'(t + Kdt)(t_N - t_K) \quad (57)$$

for $K = 1, 2, \ldots, N$. Clearly, $$y(t + Ndt) = Y, \text{ and}$$

$$y'(t + Ndt) = y''(t + Ndt) = 0,$$

so that y hits the target Y, at rest, at time $(t + Ndt)$.

Since the velocity and acceleration bounds V and A are manifested as curves in the $(y'', y')$ phase plane, an impending crossover may be detected in the same manner as for the final approach curve C, and the value of $y'''$ is determined by interpolation to avoid overshooting. The routine is depicted in its entirety in the flow diagrams of FIGS. 7-23.

The path generation technique described above is periodically performed by the computer-based control unit 22 of FIG. 1 to recursively generate a desired or commanded trajectory. The function is embodied in a computer program routine referred to herein as MINTIME, such routine being described herein in reference to the flow diagrams of FIGS. 7-23.

The status of the trajectory relative to the respective target surface, curve and position is indicated by a term ISTATE. As indicated in the following description, the term ISTATE is advantageously used to avoid recurring calculations and unplanned switches in $y'''$ between $-W$ and $+W$.

Initially, the term ISTATE is set to zero and initial conditions are defined. The initial trajectory components $y(0)-Y$, $y'(0)$ and $y''(0)$ are then used to determine which surface component $S^+$ or $S^-$ is appropriate; see FIG. 7.

Figure 8:
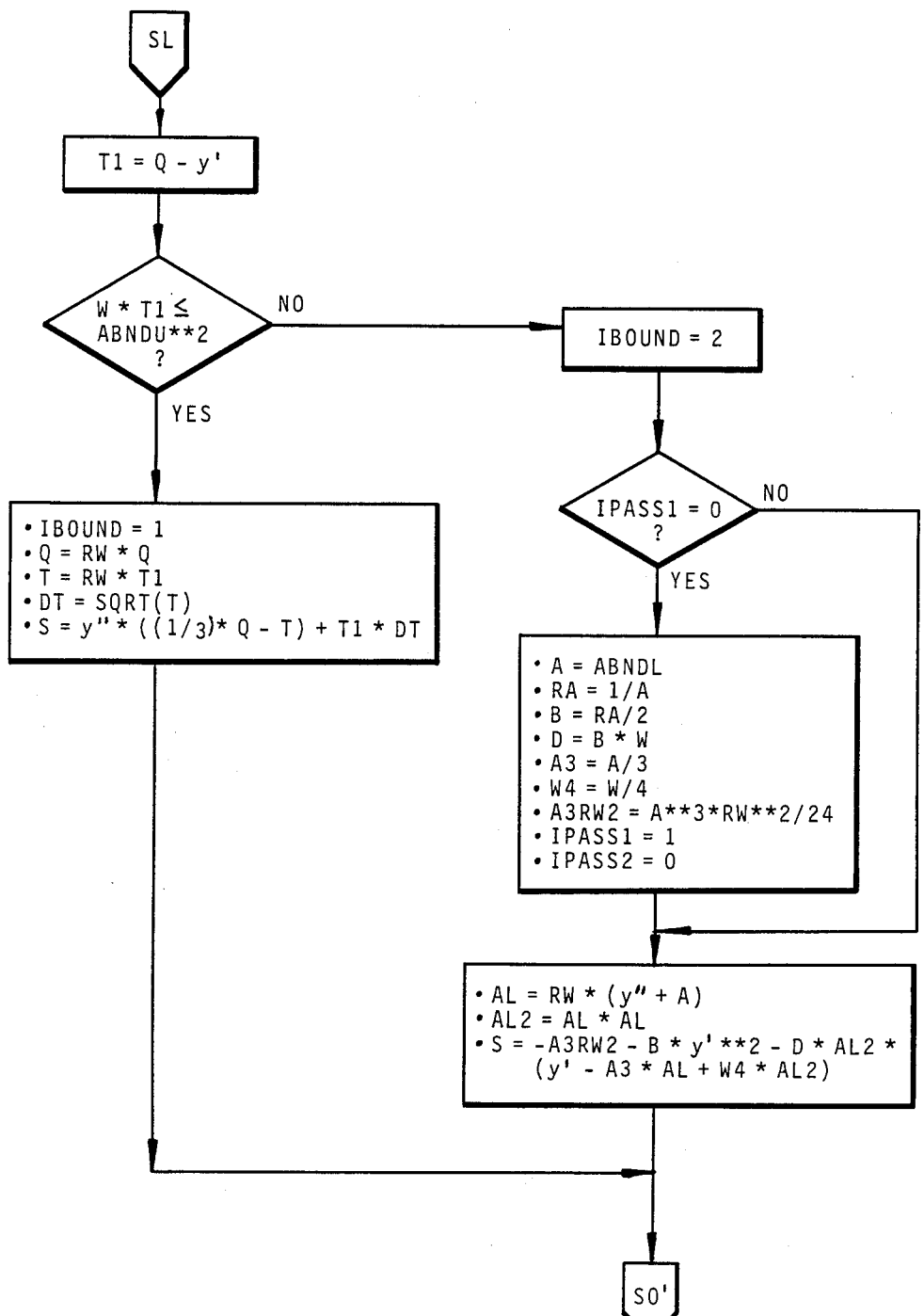
Figure 9:
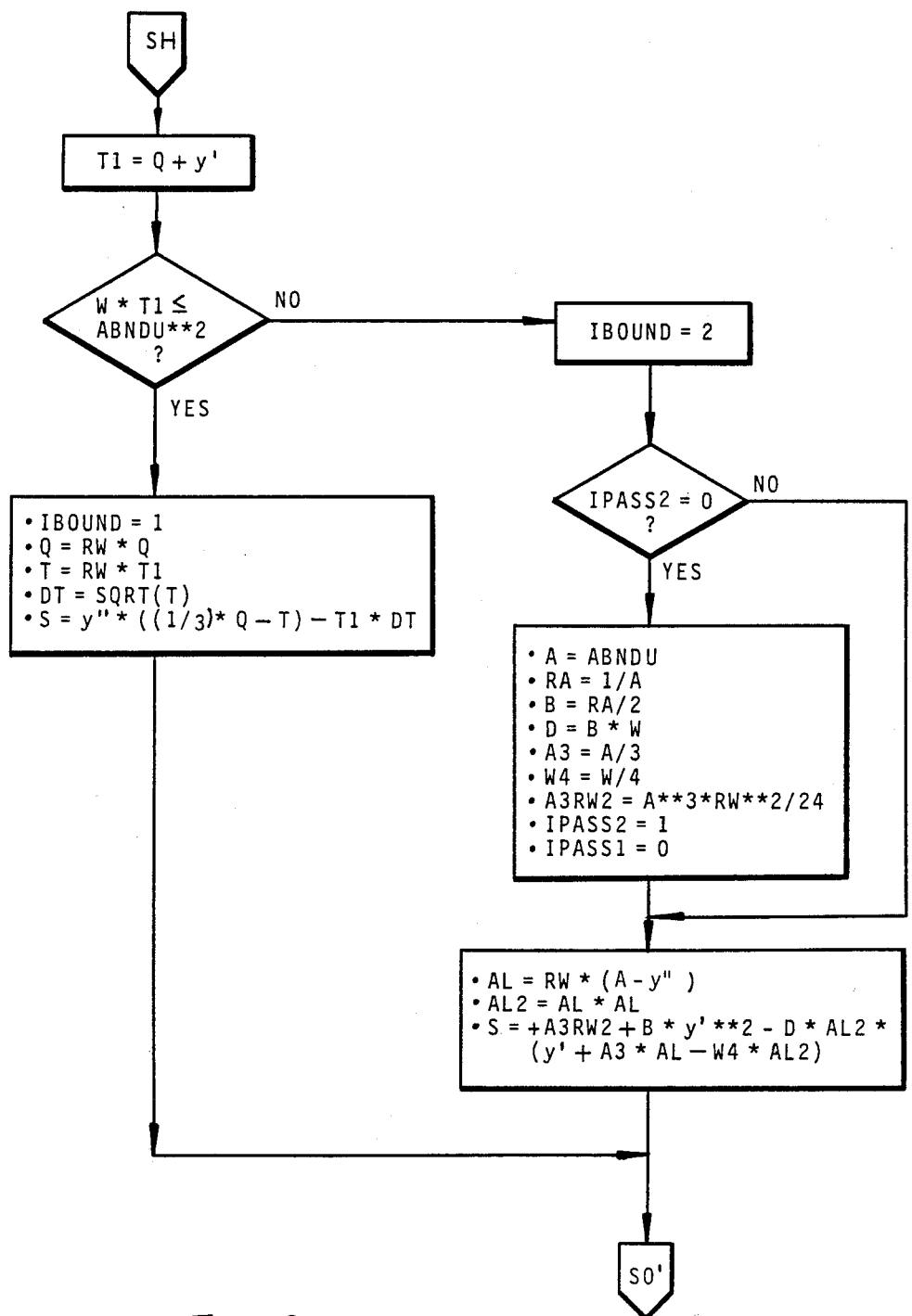

Then, the appropriate surface S(0) or S(0) is computed; see FIGS. 8 and 9. The term IBOUND is used to indicate whether unmodified or modified surfaces S, S and curves C, C are appropriate. IBOUND is set to 1 when the unmodified surface S and curve C may be used, and to 2 when the modified surface S and curve C must be used. and IBOUND is set to 2.

Figure 10:
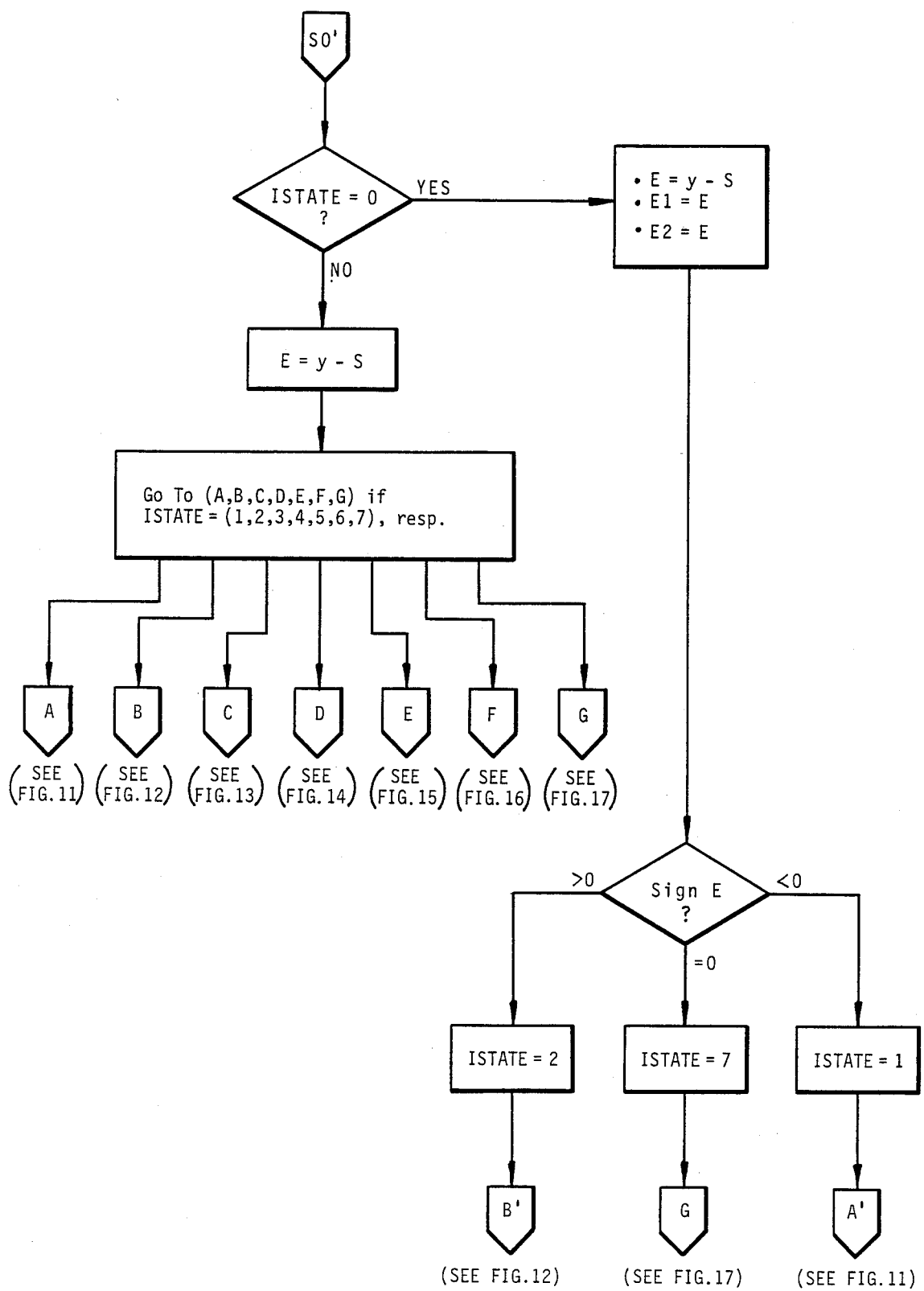
Figure 11:
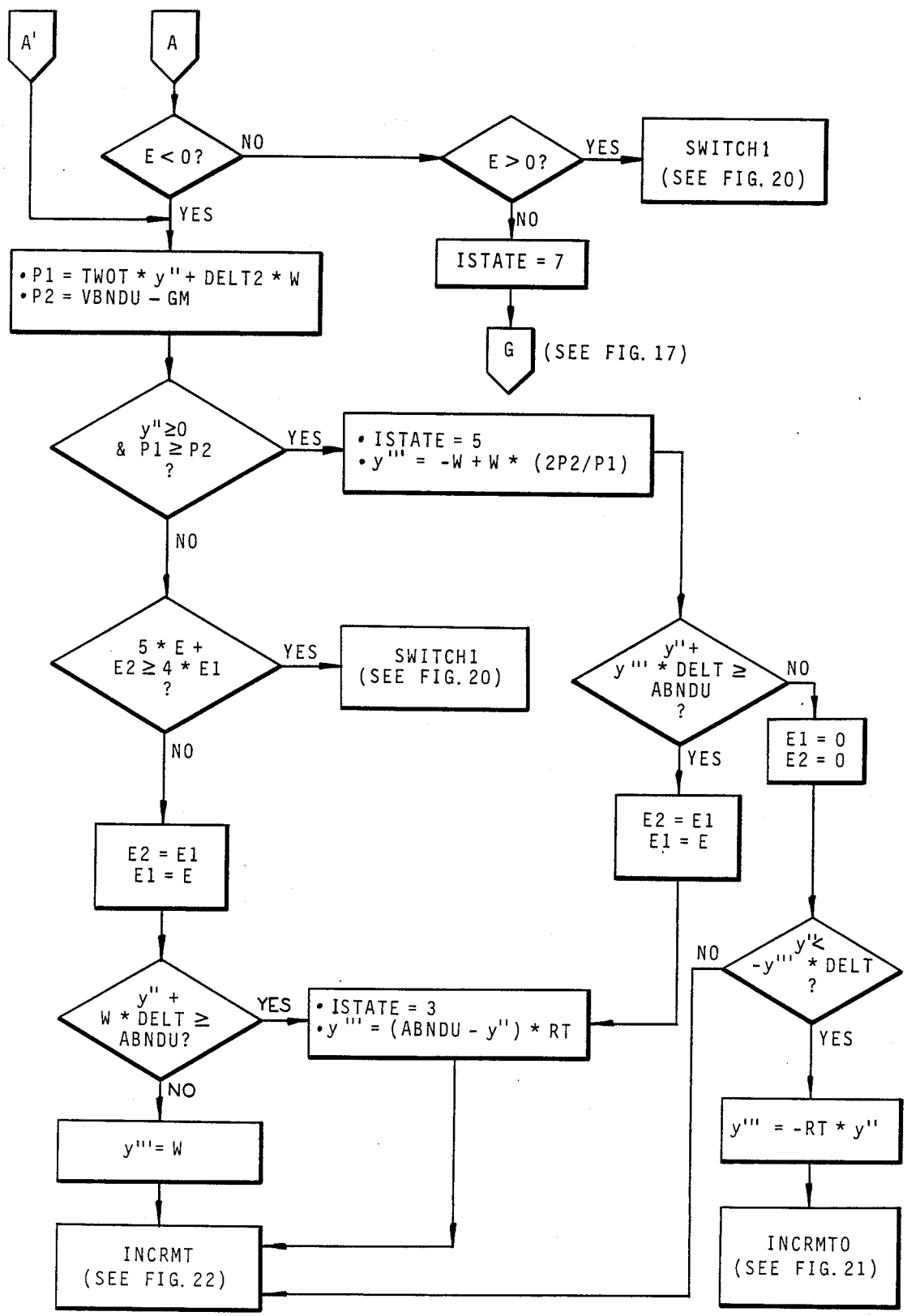
Figure 12:
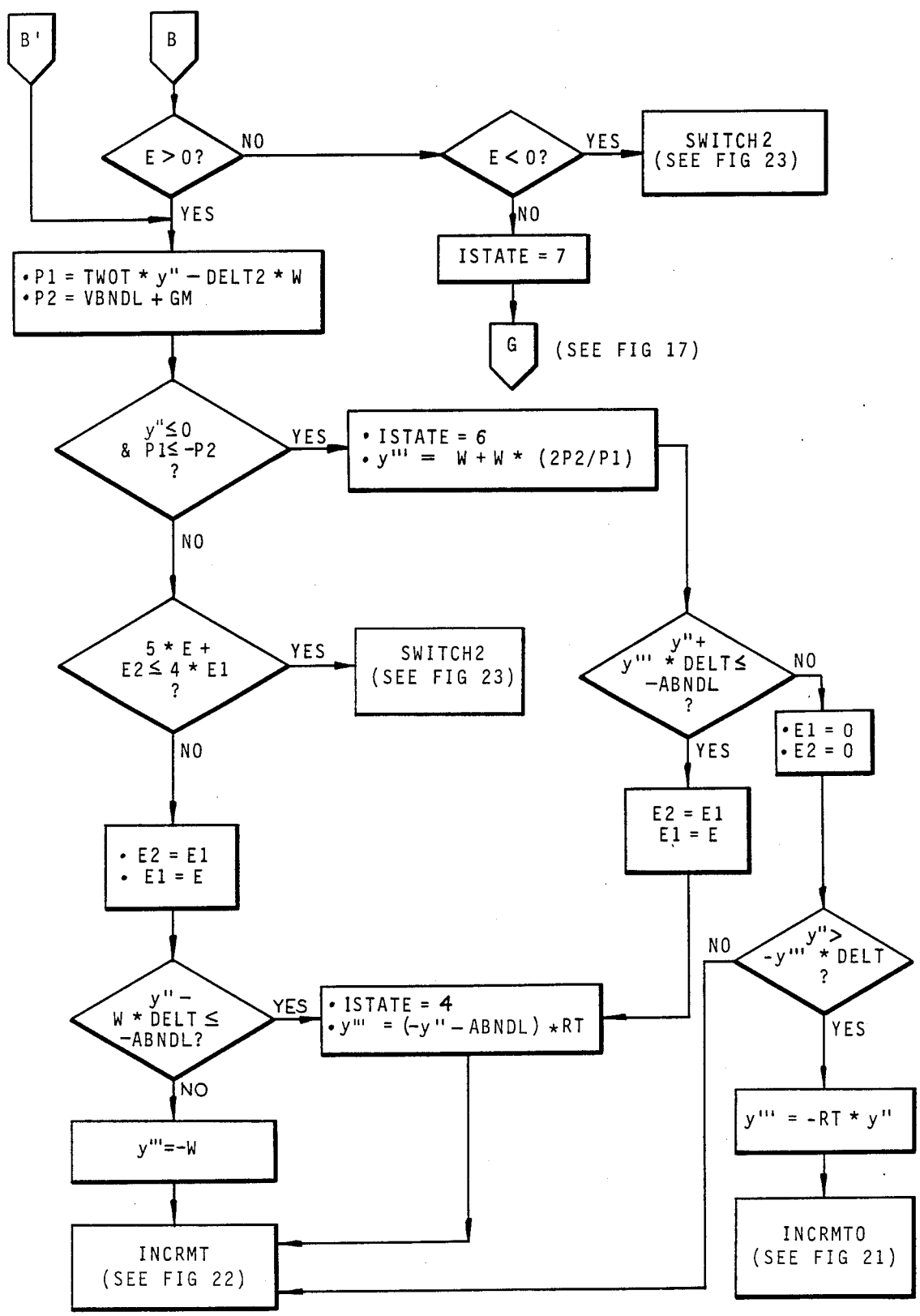

Then, the computed surface is compared to the initial trajectory position, $y(0)-Y$; see FIG. 10. If the trajectory is below the surface, ISTATE is set to 1; if the trajectory is above the surface, ISTATE is set to 2; and if the trajectory is on the surface, ISTATE is set to 7.

Figure 17:
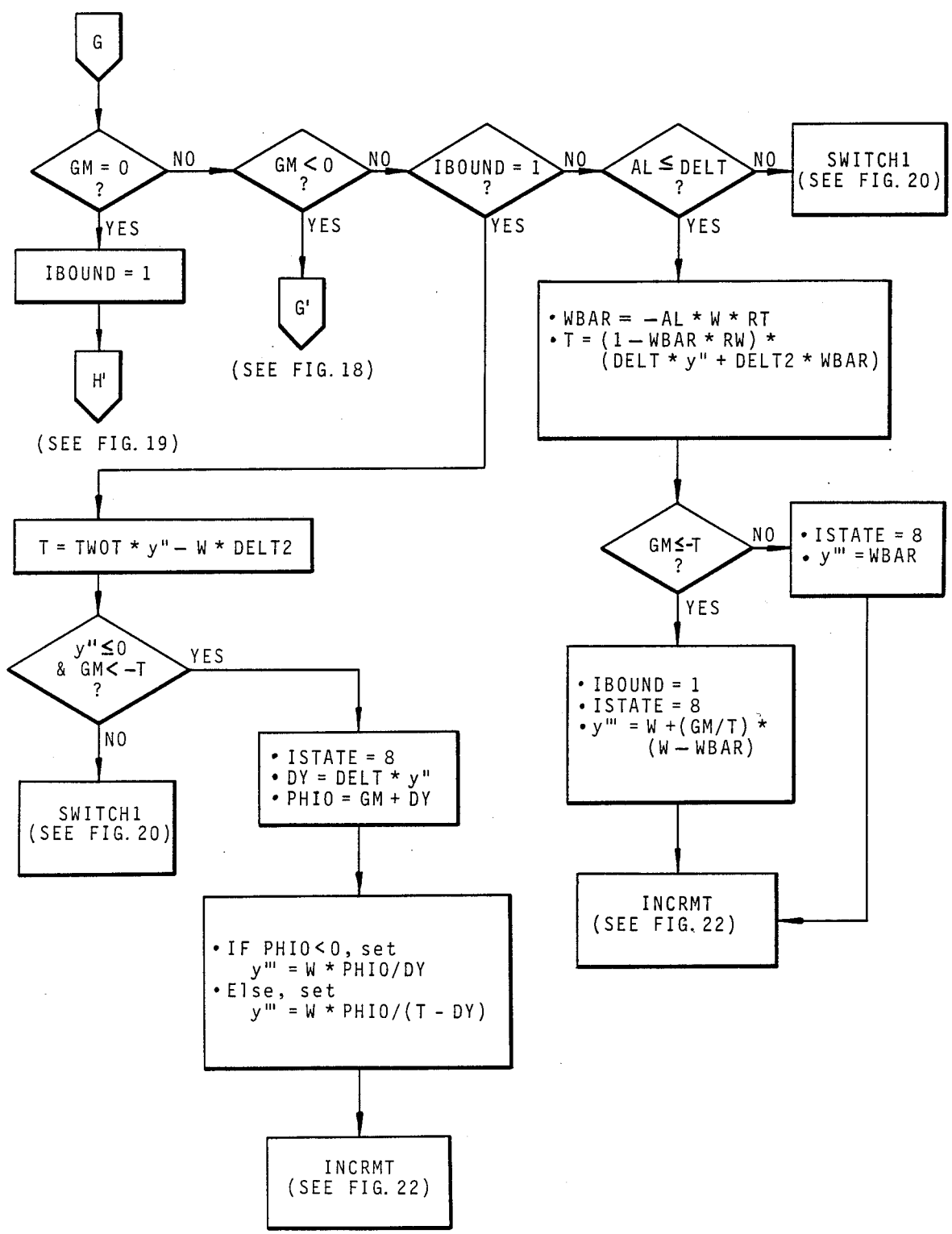
Figure 21:
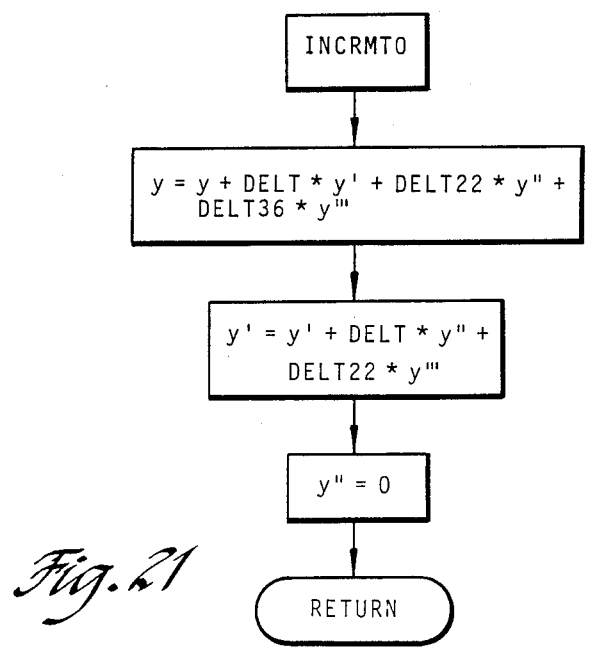
Figure 22:
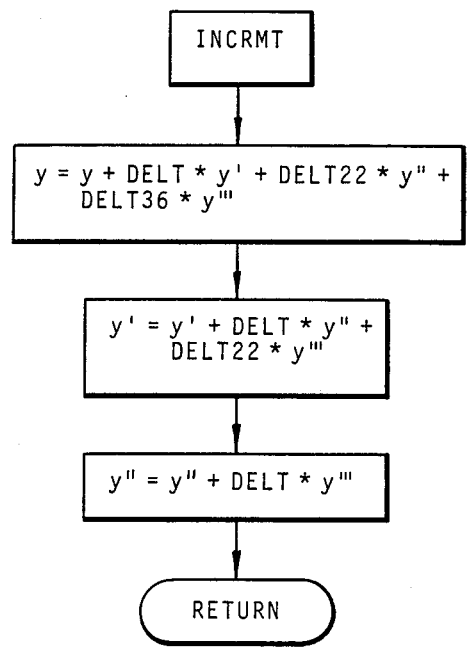
Figure 23:
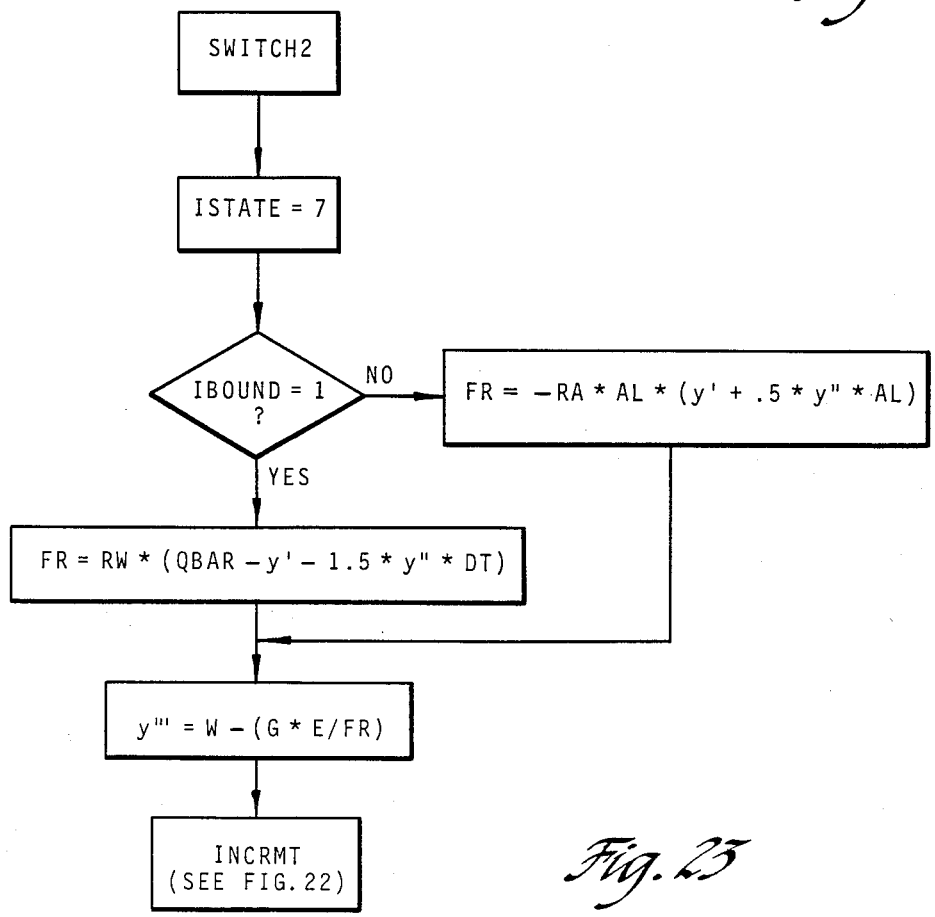

Then, the controller determines the proper value of $y'''$. If an overshoot of the surface S is impending, the term ISTATE is set to 7, and the flow diagram of FIG. 17 is executed to modify $y'''$ so that the trajectory exponentially approaches the surface. If the trajectory has hit the velocity constraint V, ISTATE is set equal to 5 or 6. If the trajectory has hit the acceleration contraint A, ISTATE is set equal to 3 or 4. If an overshoot of either constraint is impending, the controller interpolates to the constraint curve by determining an appropriate value for $y'''$ between $-W$ and $+W$. See FIG. 11 or 12. Thereafter, the flow diagrams of FIG. 21 or 22 are executed to update the trajectory components, y, y' and y'' by integration.

On the next call of the subroutine MINTIME, the current value of ISTATE is used to route the logic flow in the appropriate sequence. For example, if ISTATE=¾, the flow diagram of FIG. 13/14 is executed to check a possible surface overshoot. If detected, ISTATE is set to 7 and y'''' is modified as above so that the trajectory exponentially approaches the surface S. If the velocity constraint V is hit, the controller interpolates to the constraint and sets ISTATE to 5. If the velocity constraint V has not been hit, ISTATE remains equal to 3 and y''' is set equal to 0. Thereafter, the flow diagrams of FIG. 21 or 22 are executed to update the trajectory components y, y' and y'' by integration, as above.

Figure 15:
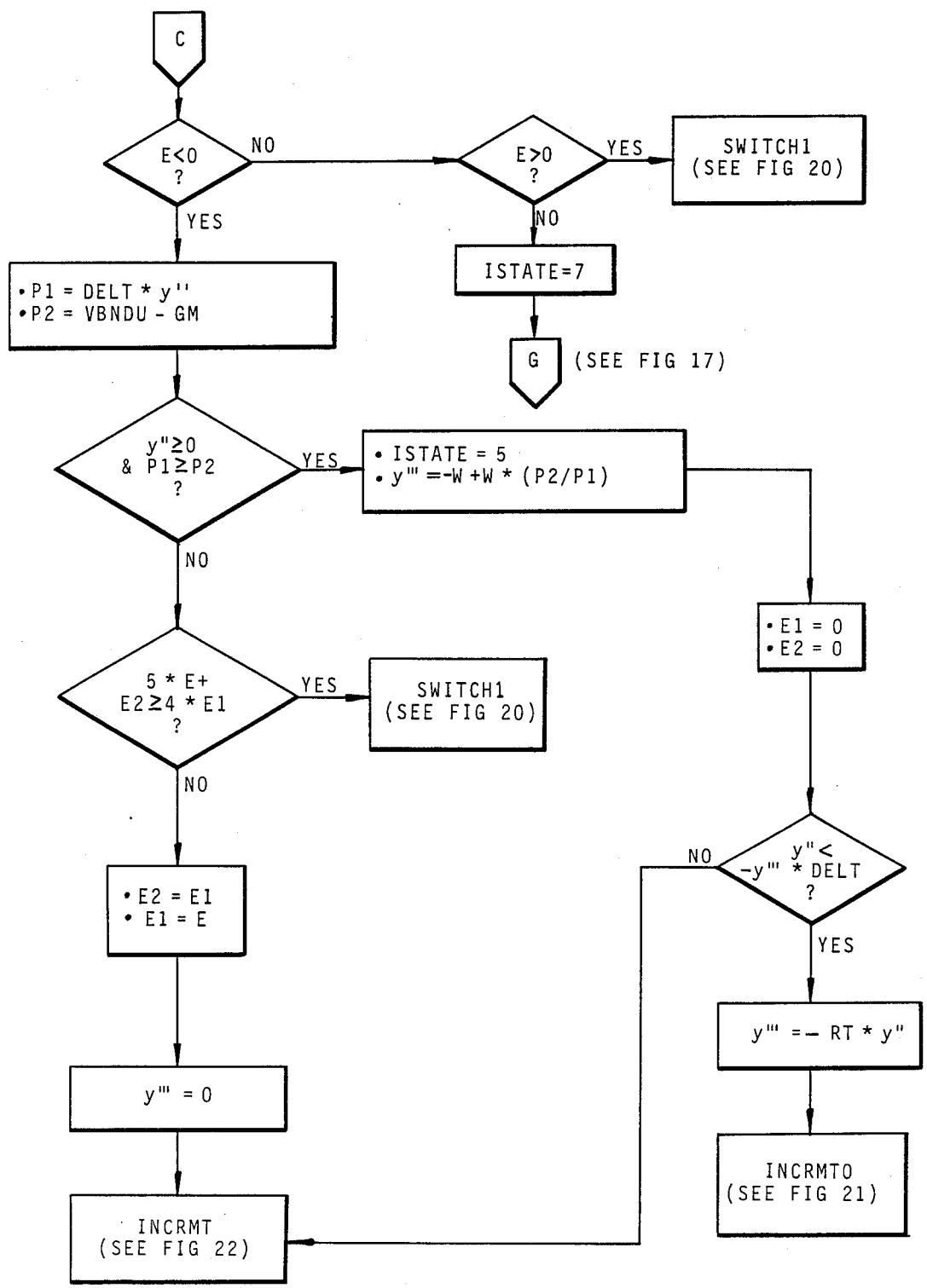
Figure 14:
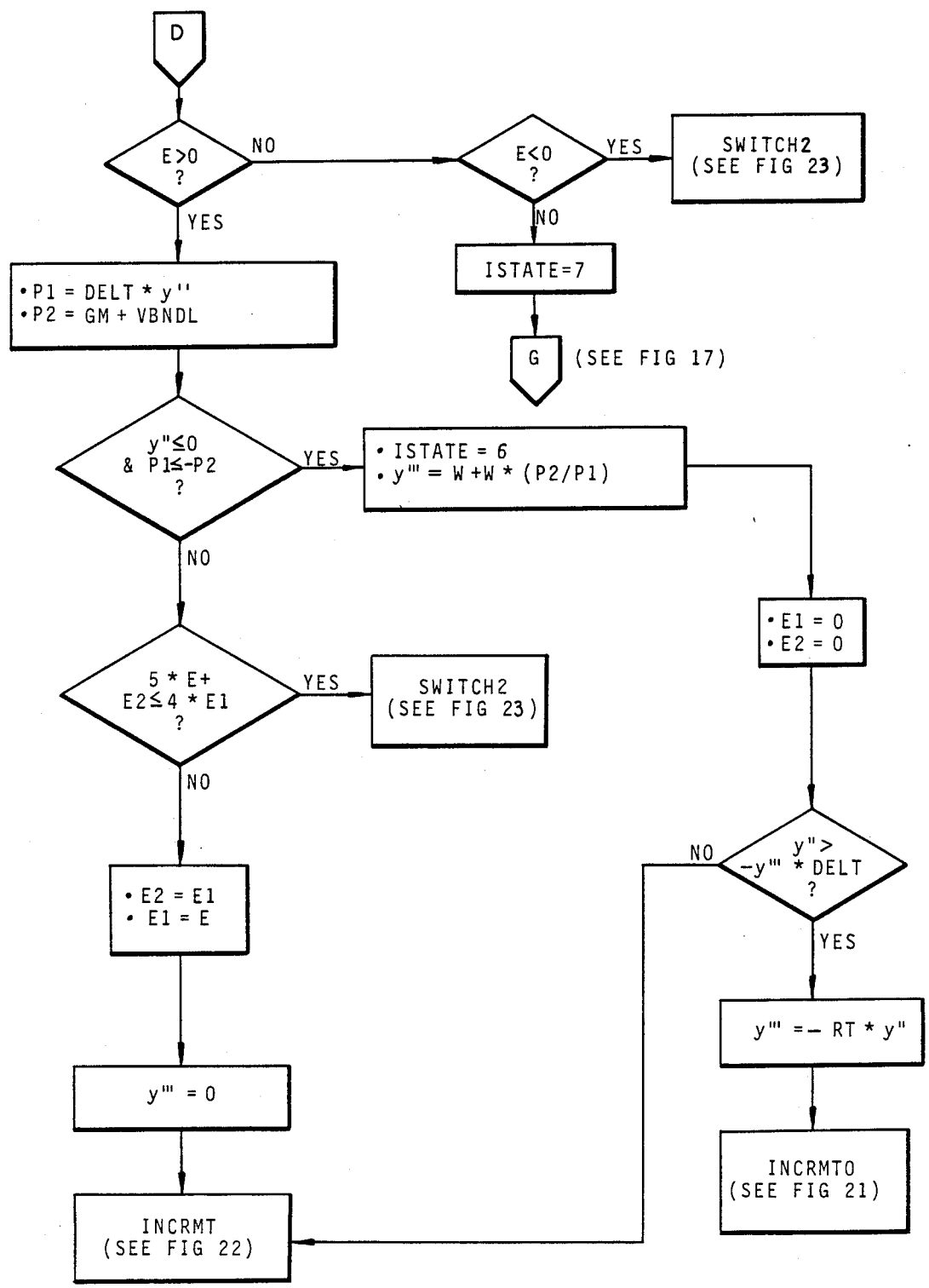
Figure 15:
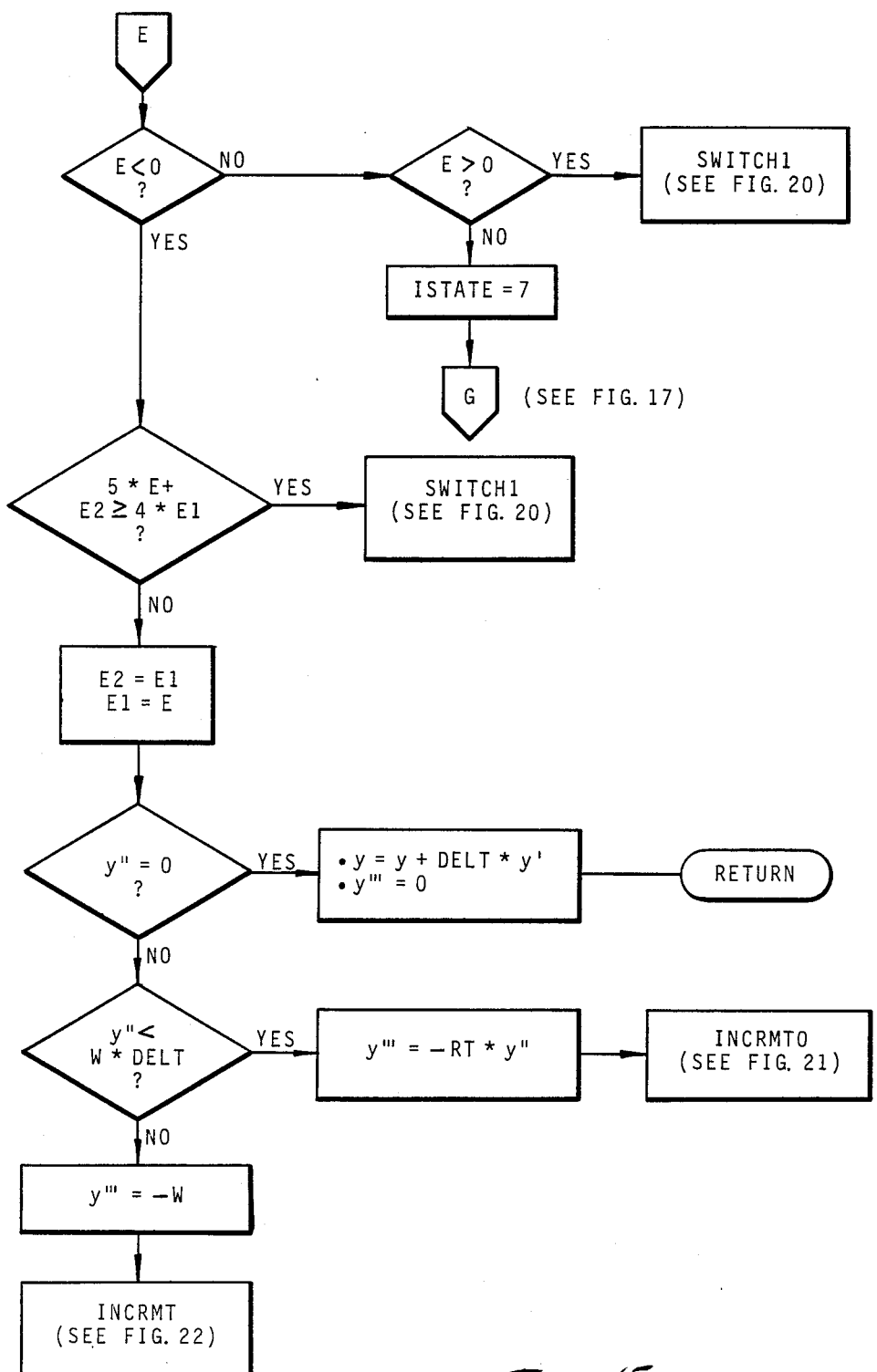
Figure 16:
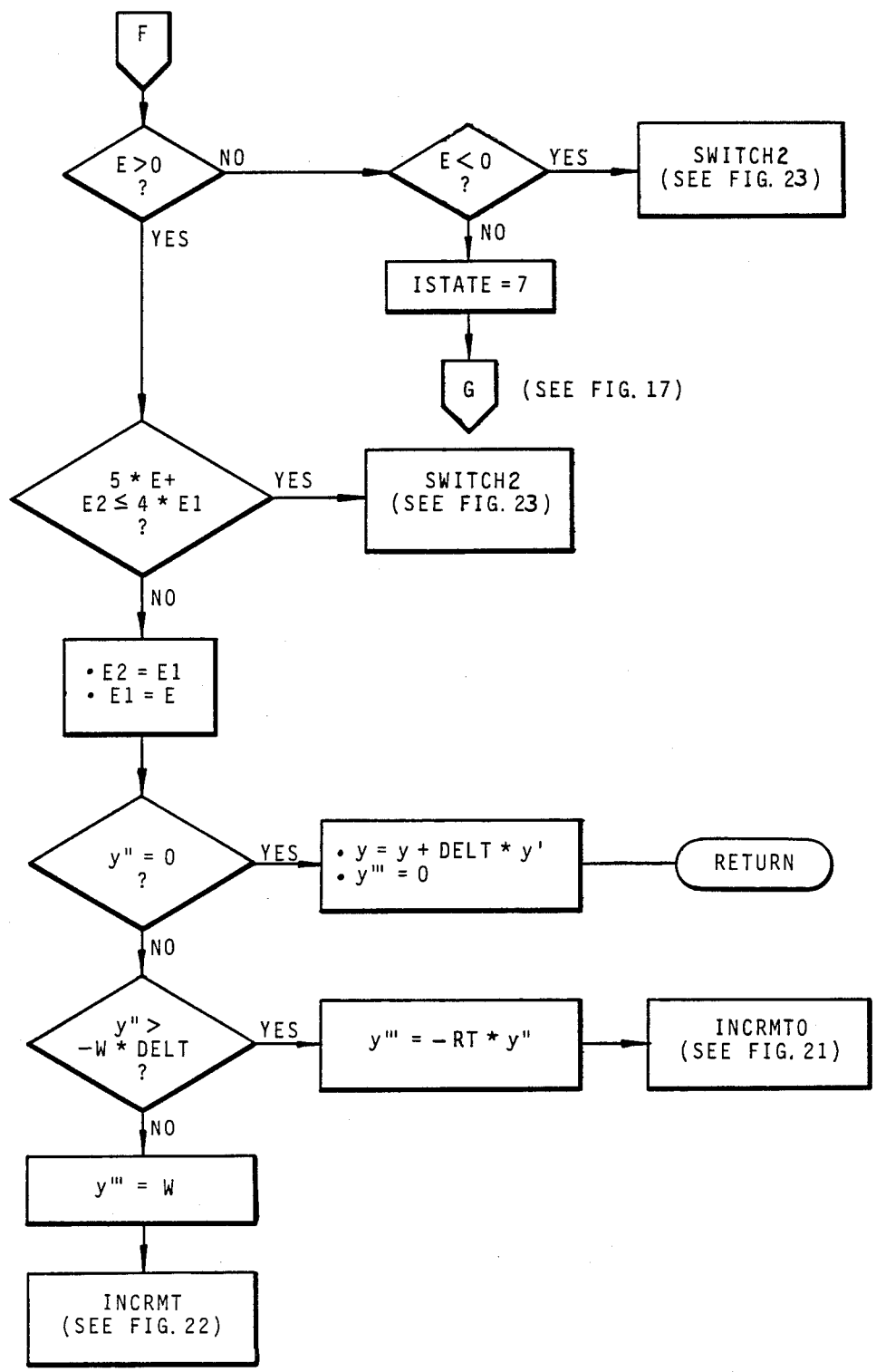

If ISTATE=5/6, the flow diagram of FIG. 15/16 is executed to check an impending surface overshoot. If detected, ISTATE is set equal to 7, as above, and y''' is modified so the trajectory exponentially approaches the surface S. If not, and y''=0, then the trajectory is at peak velocity. In such case, y'''(t) is set to zero and y(t+dt) is set equal to y(t)+y'(t)dt. If y''(t)−Wdt<0, y'''(t) is set equal to −y''(t)/dt. Otherwise, y'''(t)=−W. In either event, the flow diagrams of FIG. 21 or 22 are then executed to update the trajectory components y, y' and y'' by integration, as above.

Figure 18:
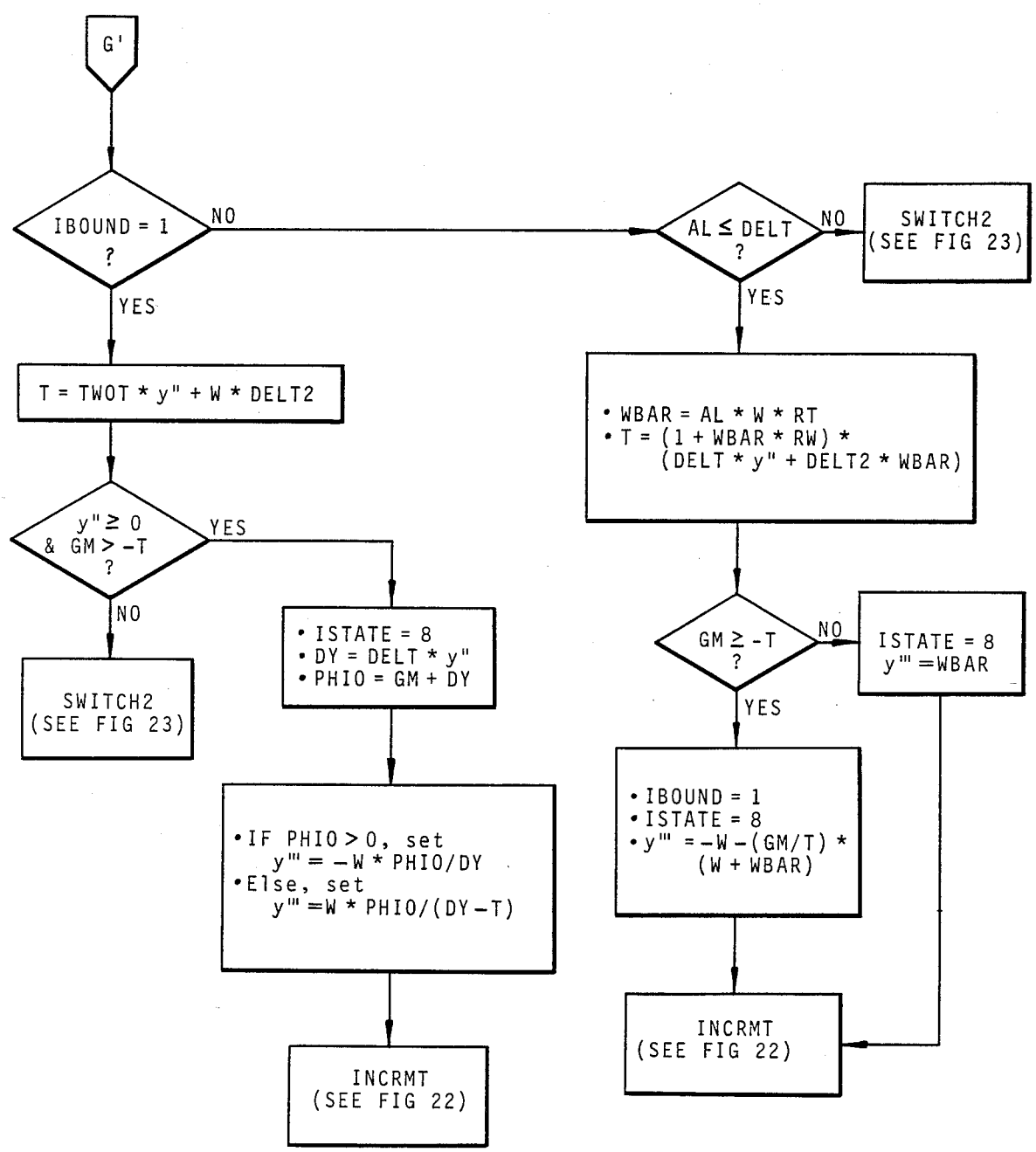
Figure 19:
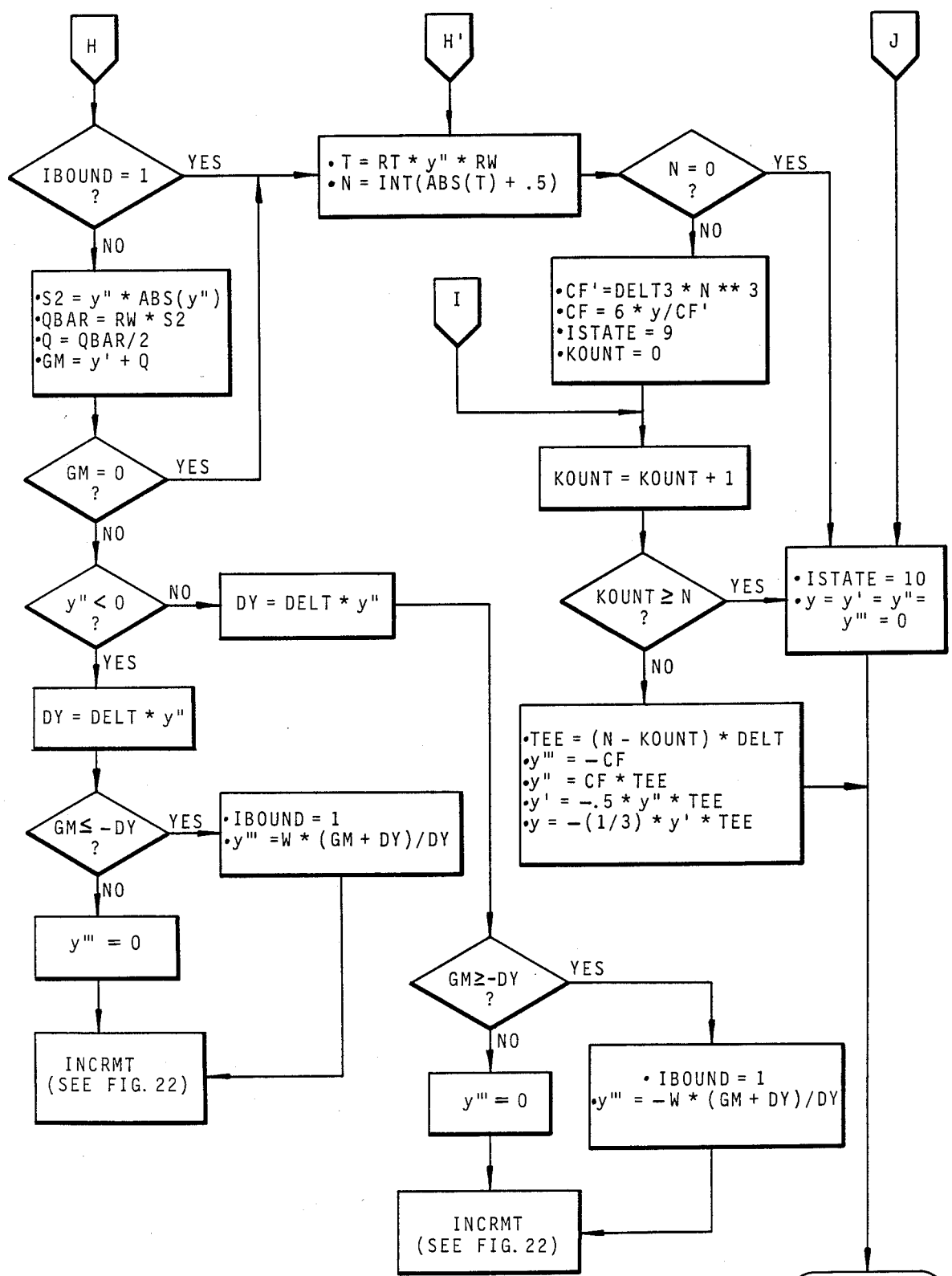
Figure 20:
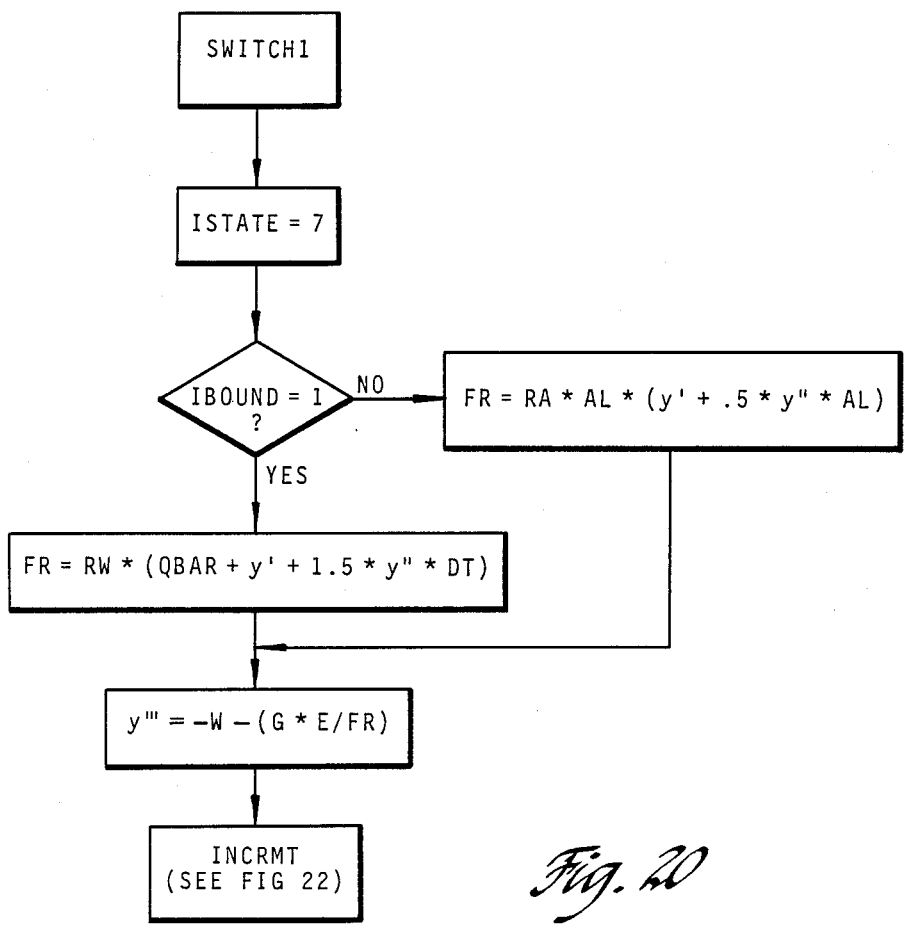

If ISTATE is set to 7, the flow diagrams of FIGS. 17–19 are executed to determine if there is an impending overshoot of the curve C. If not, the linear correction to y''' based on y(t)−Y−S(t) is continued in accordance with expressions (37) and (43) or (44). If there is an impending overshoot of the curve C with IBOUND=2, the trajectory is interpolated to the curve and the controller sets ISTATE to 8 and y'''=0 until IBOUND returns to 1. Once on the curve C, ISTATE is set to 9 and the controller computes the final approach cubic according to expressions (55)–(57). When the trajectory position y hits the target position Y at rest, ISTATE is set to 10.

The ISTATE variable can be valuable for control purposes as well, since it indicates the progress of the path. For example, the moment ISTATE=7 is reached, the path begins to decelerate to hit Y. This point could be interpreted as a signal for a change of target, in case a moving target is the real objective. Another case is ISTATE=8, which indicates that the trajectory is on the final approach to the target position. In this case, the controller could initiate a parallel operation which is to be coordinated with the attainment of y=Y at rest.

Figure 28:
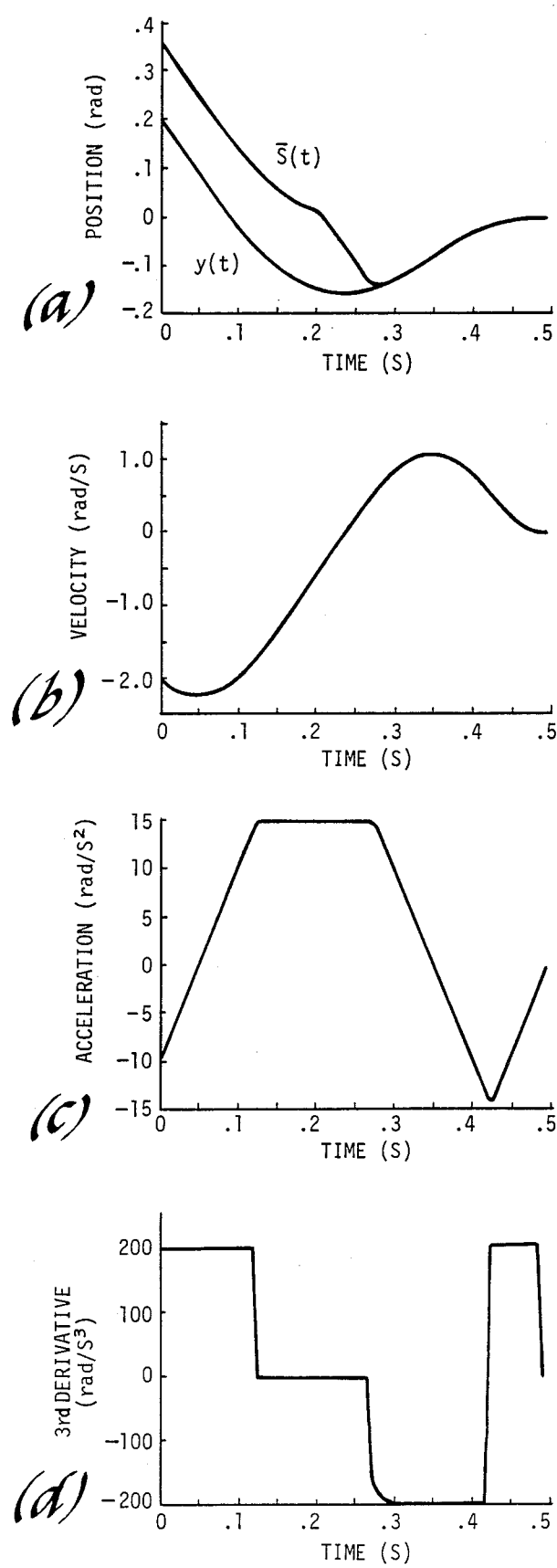

Representative trajectories generated by the MINTIME routine are graphically illustrated in FIGS. 24–28. FIG. 24 illustrates the monotonicity of the trajectory beginning and ending at rest. The acceleration limit A was chosen so large that it would not apply. In FIG. 25, both acceleration and velocity limits apply. In FIGS. 26–28, the initial position is not at rest. In FIG. 28, the initial velocity and acceleration are so large relative to the initial position that the path must overshoot the target (Y=0) and then return. This is the only way overshoot can occur. In each case, the detection of an impending crossover is indicated by a "rounding off" of the ideal square-wave behavior of y'''(t). Other deviations from ideal square-wave behavior of y''' are due to the cubic approximation of the final approach curve C.

Adaptive Feedforward Path Following

For a number of reasons, the path following function is set forth in terms of motor voltage control, as opposed to motor current control. Voltage control is preferred (at least in applications having variable load torque requirements) because, unlike current control, it is relatively insensitive to changes in the load torque. While it can be sensitive to changes in motor speed, an accurate measure of motor speed can be readily obtained.

With the load torque insensitivity of voltage mode control, the motor dynamics—not the load torque—dominate the servo system behavior. For an armature controlled DC servomotor under inertial load such as the motor 12 of FIG. 1, such dynamics can be algebraically expressed as follows:

$$u = x'''(LJ)/K_T + x''(LB+RJ)/K_T + x'(RB+K_eK_T)/K_T + (RT_f)/K_T \quad (58)$$

where:
u = motor voltage
R = armature resistance
L = armature inductance
J = motor plus load inertia
$K_T$ = motor torque constant $K_T$
B = viscous damping constant
$K_e$ = back-EMF constant
$T_f$ = torque due to static friction
x, x', x'' and x''' = motor position, velocity, acceleration and jerk.

It is noted that the form of expression (58) is substantially the same for AC electric servomotors and hydraulic servomotors.

For convenience, expression (58) is abbreviated to:

$$u = v_3 x''' + v_2 x'' + v_1 x' + V_f \quad (59)$$

where:

$$v_3 = (LJ)/K_T$$

$$v_2 = (LB+RJ)/K_T$$

$$v_1 = (RB+K_eK_T)/K_T, \text{ and}$$

$$V_f = (RT_f)/K_T.$$

The third-order character of expressions (58) and (59) requires that the commanded trajectory also be third-order. In other words, the third derivative y''' of the commanded position y must be bounded. By definition, the trajectory developed by the path generation function of this invention satisfies this criteria.

Assuming a reference or command path y(t) as defined above, the tracking error e(t) is defined as:

$$e(t) = y(t) - x(t) \quad (60)$$

The reference or commanded trajectory is tracked using feedback terms based on the tracking error and its rate of change, feedforward terms based on the tracking error and the trajectory components y', y'' and y''', and a static friction term $v_f$. Algebraically, this is expressed as follows:

$$u(t) = u_e(t) + v_3 y'''(t) + v_2 y''(t) + v_1 y'(t) + v_f \quad (61)$$

The feedback term $u_e(t)$ is based on the tracking error e(t) defined in expression 60, and may be determined in any manner which renders stable the error equation:

$$v_1 e'(t) + v_2 e''(t) + v_3 e'''(t) + u_e(t) = 0 \quad (62)$$

This is the equation that results under the control of expression (61) with the assumption that $v_f = V_f$. In the illustrated embodiment, the feedback term $u_e(t)$ was determined using a conventional proportional plus derivative technique as follows:

$$u_e(t) = g_1 e(t) + g_2 e'(t),$$

with $g_1$ and $g_2$ chosen for stability of expression (62). In such case, $e''(t)$, $e'(t)$ and $e(t)$ all converge asymptotically to zero, and the motor position x will track the reference trajectory in terms of position y, velocity y' and acceleration y''.

The feedforward parameters $v_1$–$v_3$ relate to physical parameters of the motor as defined above, and are tuned in real time to drive expression (61) into conformance with the physical system. As explained below, the feedforward parameters are individually adjusted in proportion to the product of the tracking error and the respective multiplier of expression (61). For example, the parameter $v_1$ is adjusted in relation to the product of $e(t)$ and $y'(t)$. Algebraically:

$$(v_1)_{+1} = (v_1)_0 + k_1(e)_0(y'(t))_0,$$

$$(v_2)_{+1} = (v_2)_0 + k_2(e)_0(y''(t))_0, \text{ and}$$

$$(v_3)_{+1} = (v_3)_0 + k_3(e)_0(y'''(t))_0$$

where the subscript "0" designates the present value of the term, and the subscript "+1" designates the value of the term for the next time step (i.e., dt seconds later).

The static friction term $v_f$ is directionally dependent. It has a value of $+v_4$ if $y' > 0$, and $-v_5$ if $y' < 0$. The terms $v_4$ and $v_5$ are adjusted as follows:

If $(y')_0 > 0$, then $(v_4)_{+1} = (v_4)_0 + k_4 (e)_0$, and
$(v_5)_{+1} = (v_5)_0$.

If $(y')_0 < 0$, then $(v_4)_{+1} = (v_4)_0$, and
$(v_5)_{+1} = (v_5)_0 - k_5 (e)_0$.

If $(y')_0 = 0$, then $v_4$ and $v_5$ are unchanged.

A diagram illustrating the path following function in control system format is depicted in FIG. 29. In that diagram, the path generation function of this invention provides the y''' limitation from which y'', y' and y are computed by successive integration. The tracking error $e(t)$ is determined according to the difference between the path position y and the feedback motor position x, and used to compute the various terms $v_1$–$v_5$. The feedback, static friction and feedforward voltages are summed to form a control voltage V, which is applied to the voltage-mode power amplifier for suitably energizing the servomotor 12.

Motion Control System

A flow diagram for carrying out the motion control functon of this invention is set forth in FIG. 30. The block 100 in FIG. 30 generally designates a series of program instructions executed at the initiation of each period of servo operation for initializing the values of various terms and registers. For example, the term ISTATE of the path generation routine is set to zero and the feedforward parameters $v_1$–$v_5$ are set to a predetermined estimate of their true value, or to values "learned" in a prior period of operation.

Following initialization of the various terms and registers of control unit 22, a real time clock is started as indicated by the block 102, and the instruction blocks 104–120 are repeatedly executed in sequence as indicated by the flow diagram lines 122. Blocks 78–120 operate in connection with the real time clock and an interrupt counter (INT COUNTER) to set the execution rate of blocks 104–116.

The minimum time path generation control of this invention was implemented together with the adaptive feedforward tracking routine described herein on a Motorola 68000 microprocessor with floating point firmware. The objectives of minimum time to target and substantially no overshoot, were achieved with a main loop cycle time of approximately 5.25 milliseconds.

Figure 31:
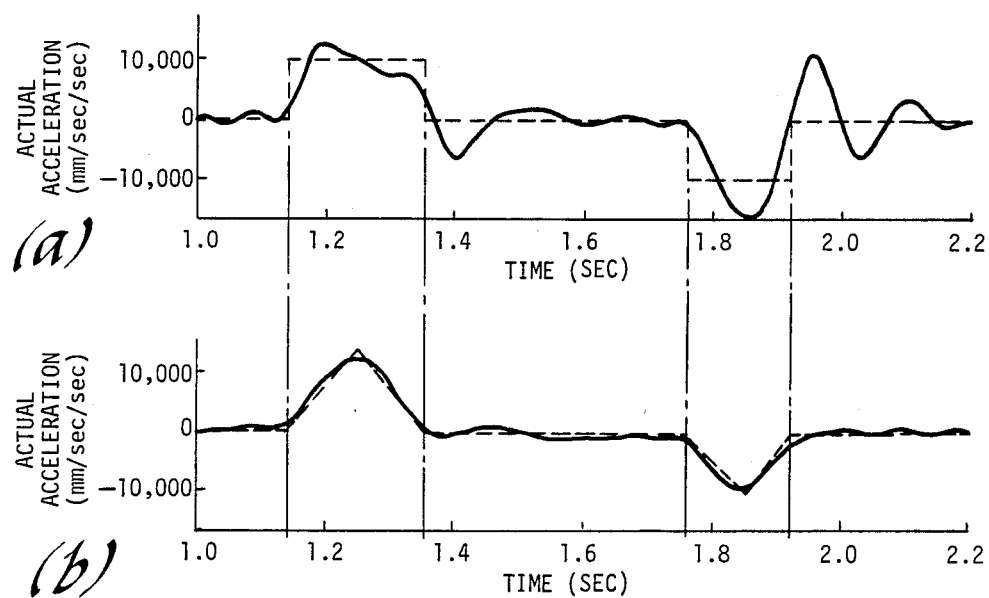
Figure 32:
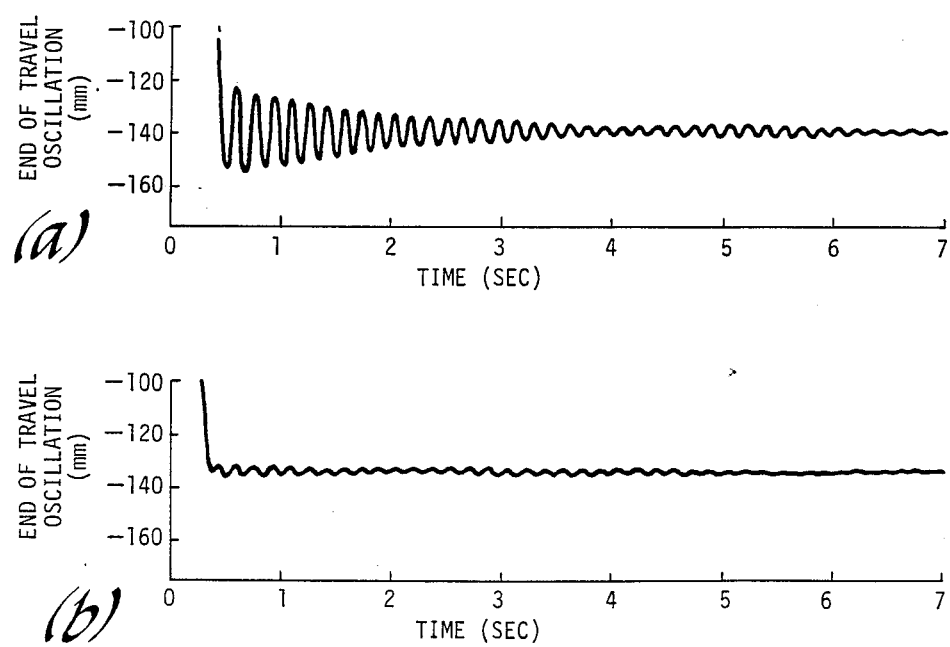

FIGS. 31 and 32 graphically depict the improvements observed in an application of the above mechanization to the waist axis servo of a conventional industrial robot. Each Figure depicts the operation of the servo at full rated speed with both a conventional motion control system and the subject motion control system.

FIG. 31 depicts the actual acceleration of the servo, using equal acceleration scales and a common time base. The conventional control (Graph A) is second-order and commands step changes in the acceleration, as indicated by the broken trace 100. When the acceleration is commanded at time $t_1$, the servo cannot achieve the step change and there is a large initial error, followed by an overshoot and damped oscillation. The same phenomena occur when the deceleration is commanded at time $t_2$. In practice, this results in unsteadiness and overshoot of the target position. The control of this invention (Graph B) is third-order and results in a trackable acceleration command. The acceleration of the servo follows the commanded value, with substantially no overshoot of the target position. The motor voltage and current traces (not shown) have similar profiles.

FIG. 32 depicts the servo end of travel oscillation, as measured at the tip of a resilient servo load (end effector). Such oscillation corresponds to the settling time of the load once the target position has been achieved. With the conventional control (Graph A), there is pronounced oscillation which damps out to a relatively low level after approximately six seconds. With the control of this invention, the oscillation is much smaller and damps out to substantially the same level after two seconds. The faster settling time achieved with the motion control of this invention permits increased cycle time in applications such as spot welding where significant load oscillation is not permitted. Moreover, the reduced number and amplitude of the attendant torque reversals results in improved life of the servo.

While this invention has been described herein in reference to the illustrated embodiment, it will be understood that various modifications will occur to those skilled in the art. For example, the path generation function of this invention is equally applicable to hydraulic servo systems or electrical servo systems including an AC servo motor. Motion control systems incorporating these and other modifications may fall within the scope of this invention which is defined by the appended claims.

The embodiments of the invention in which an exclusive property or privilege is claimed are defined as follows:

1. A motion control path generation method for defining third-order trajectory position, velocity and acceleration parameters y, y' and Y'' for steering an output member of a servo mechanism from a current position y(0) to a target position Y, such method comprising the steps of:

defining a limit W on the third derivative y''' of the trajectory position y in relation to the ability of the servo mechanism to change the output member acceleration;

defining a curve C containing the set of all trajectory parameters y, y' and y'' which can be steered to the target position Y, with $y''' = \pm W$;

defining a surface S containing the set of all trajectory parameters y, y' and y'' which can be steered to the curve C, with $y''' = \pm W$;

successively integrating y''' to determine the trajectory acceleration, velocity and position parameters y'', y' and y;

setting the magnitude and sign of y''' at periodic time intervals dt such that (1) the trajectory approaches the surface S prior to coincidence of the output member position y(0) with the surface S, (2) the trajectory follows the surface S toward the curve C after coincidence of the output member position y(0) with the surface S, but prior to coincidence of the output member position y(0) with the curve C, and (3) the trajectory follows the curve C toward the target position Y after coincidence of the output member position y(0) with the curve C; and setting the trajectory velocity, acceleration and jerk parameters y', y'' and y''' to zero when the output member position y(0) coincides with the target position Y, thereby to prevent further adjustment of the output member position.

2. The method set forth in claim 1, wherein the step of setting the magnitude and sign of y''' prior to coincidence of the output member position y(0) with the surface S comprises the steps of:

detecting an imminent crossing of the trajectory and the surface S; and in response to such detection, reducing the magnitude of y''' in relation to the distance $e_s$ between the output member position y(0) and the surface S such that the trajectory exponentially approaches the surface S.

3. The method set forth in claim 2, where the step of detecting an imminent crossing of the trajectory and the surface S comprises the steps of:

computing the values of the trajectory position y(t+dt) and surface S(t+dt) for the next time interval dt; and adjusting the magnitude of y''' in relation to the difference y(t+dt)−S(t+dt) when such difference indicates that a crossing of the surface will have occurred by the next time interval dt.

4. The method set forth in claim 2, where the time interval dt is·dt seconds and the step of detecting an imminent crossing of the trajectory and the surface S comprises the steps of:

projecting the values of the trajectory position y(t+dt) and surface S(t+dt) for the next interval based on previous values of y(t) and S(t); and adjusting the magnitude of y''' in relation to the difference y(t+dt)−S(t+dt) when such difference indicates that a crossing of the surface S will have occurred by the next time interval.

5. The method set forth in claim 2, where, upon detection of an imminent crossing of the trajectory and the surface S, the magnitude of y''' is reduced in relation to the time interval dt and the distance $e_s$ such that the time rate of change $e_s'$ of the distance $e_s$ varies in substantial proportion to the distance $e_s$.

6. The method set forth in claim 1, wherein the step of setting the magnitude and sign of y''' after coincidence of the output member position y(0) with the surface S, but prior to coincidence of the output member position y(0) with the curve C comprises the steps of:

reversing the sign of y'''; and resetting the magnitude of y''' to W.

7. The method set forth in claim 6, wherein the step of setting the magnitude and sign of y''' after coincidence of the output member position y(0) with the surface S, but prior to coincidence of the output member position y(0) with the curve C comprises the further steps of:

determining the value of the curve C for the next time interval C(t+dt) to detect if a crossing of the curve C will have occurred; and in response to such detection defining a new magnitude of y''' based on an interpolation of the trajectory position over the time interval dt so that the trajectory will coincide with the curve C substantially at such next time interval.

8. The method set forth in claim 1, wherein the step of setting the magnitude and sign of y''' after coincidence of the output member position y(0) with the curve C includes the steps of:

reversing the sign of y'''; and setting the magnitude of y''' to W.

9. The method set forth in claim 8, wherein the step of setting the magnitude and sign of y''' after coincidence of the output member position y(0) with the curve C further includes the steps of:

defining a cubic approximation of the distance between the output member position y(0) and the target position Y; and setting the magnitude of y''' in relation to such cubic approximation such that the output member position y(0) coincides with the target position Y in an integral number of time intervals dt.

10. The method set forth in claim 1, including the steps of:

defining velocity limit boundary curves for the trajectory in the y', y'' phase plane in relation to the velocity limit V of the servo mechanism; and reversing the sign of y''' when the velocity and acceleration parameters y', y'' coincide with the velocity limit boundary curves, thereby to invoke the maximum deceleration of the servo mechanism output member to keep the trajectory velocity parameter within the velocity limit.

11. The method set forth in claim 10, including the steps of:

determining the value of the velocity and acceleration parameters y'(t+dt) and y''(t+dt) for the next time interval to detect if a crossing of the velocity boundary curves will have occurred; and in response to such detection defining a new magnitude of y''' based on an interpolation of the trajectory velocity and acceleration over the time interval dt so that the trajectory will coincide with the respective velocity boundary curve substantially at such next time interval.

12. The method set forth in claim 1, including the steps of:

defining an acceleration limit A for the acceleration parameter y'' of the trajectory in relation to the ability of the servo mechanism to accelerate the output member; and reducing the magnitude of y''' to zero when the acceleration parameter y'' of the trajectory coincides with the acceleration limit A, thereby to maintain the trajectory acceleration parameter substantially constant at the acceleration limit A.

13. The method set forth in claim 12, including the steps of:
    determining the value of the acceleration parameter y"(t+dt) for the next time interval dt to detect if a crossing of the acceleration limit A will have occurred by the next time interval; and in response to such detection
    defining a new magnitude of y''' based on an interpolation of the trajectory acceleration over the time interval dt so that the trajectory acceleration parameter will coincide with the acceleration limit substantially at such next time interval.

14. The method set forth in claim 1, including the steps of:
    defining an acceleration limit A for the acceleration parameter y" of the trajectory in relation to the ability of the servo mechanism to accelerate the output member; and
    redefining the curve C to include a boundary of constant acceleration equal to the acceleration limit A if it is determined that the acceleration parameter y" of the trajectory will exceed the acceleration limit before the trajectory crosses the curve C, whereby the acceleration parameter of the trajectory is automatically limited to the acceleration limit A.

* * * * *